US007490683B2

(12) United States Patent
Schaffner

(10) Patent No.: US 7,490,683 B2
(45) **Date of Patent: *Feb. 17, 2009**

(54) CURB-CLIMBING POWER WHEELCHAIR

(76) Inventor: Walter E. Schaffner, P.O. Box 44, Shavertown, PA (US) 18627

(*) Notice: Subject to any disclaimer, the term of this patent is extended or adjusted under 35 U.S.C. 154(b) by 547 days.

This patent is subject to a terminal disclaimer.

(21) Appl. No.: 11/009,856

(22) Filed: Dec. 11, 2004

(65) Prior Publication Data

US 2005/0127631 A1 Jun. 16, 2005

Related U.S. Application Data

(60) Provisional application No. 60/530,041, filed on Dec. 15, 2003.

(51) Int. Cl.
*B60G 1/00* (2006.01)

(52) U.S. Cl. ....................... 180/65.1; 180/901; 280/755

(58) Field of Classification Search ................ 180/65.1, 180/901, 24.02; 280/250.1, 755
See application file for complete search history.

(56) References Cited

U.S. PATENT DOCUMENTS

| | | | | | |
|---|---|---|---|---|---|
| 4,840,394 | A | * | 6/1989 | Bickler | 280/677 |
| 5,292,144 | A | * | 3/1994 | Sosnoff | 280/304.1 |
| 5,575,348 | A | * | 11/1996 | Goertzen et al. | 180/65.6 |
| 5,727,802 | A | * | 3/1998 | Garven, Jr. et al. | 280/250.1 |
| 5,772,237 | A | * | 6/1998 | Finch et al. | 180/65.1 |
| D397,645 | S | | 9/1998 | Schaffner | |
| 5,851,019 | A | * | 12/1998 | Gill et al. | 280/286 |
| D404,693 | S | | 1/1999 | Schaffner | |
| 5,944,131 | A | | 8/1999 | Schaffner et al. | |
| 6,070,898 | A | | 6/2000 | Dickie et al. | |
| 6,129,165 | A | | 10/2000 | Schaffner et al. | |
| 6,131,679 | A | | 10/2000 | Pulver et al. | |
| 6,176,335 | B1 | | 1/2001 | Schaffner et al. | |
| 6,186,252 | B1 | | 2/2001 | Schaffner et al. | |
| 6,196,343 | B1 | | 3/2001 | Strautnieks | |
| 6,199,647 | B1 | | 3/2001 | Schaffner et al. | |
| 6,234,507 | B1 | | 5/2001 | Dickie et al. | |
| 6,279,927 | B1 | * | 8/2001 | Nishihira et al. | 280/43 |
| 6,341,657 | B1 | | 1/2002 | Hopely, Jr. et al. | |
| 6,357,793 | B1 | | 3/2002 | Dickie et al. | |
| 6,460,641 | B1 | | 10/2002 | Kral | |
| 6,601,863 | B1 | * | 8/2003 | Mentessi et al. | 280/304.1 |
| 6,640,916 | B2 | | 11/2003 | Schaffner et al. | |
| 6,712,369 | B2 | * | 3/2004 | Wu | 280/5.2 |
| 7,083,195 | B2 | * | 8/2006 | Goertzen et al. | 280/755 |
| 7,219,924 | B2 | * | 5/2007 | Mulhern et al. | 280/755 |
| 7,234,554 | B2 | * | 6/2007 | Mulhern et al. | 180/65.6 |

* cited by examiner

*Primary Examiner*—Christopher Ellis
*Assistant Examiner*—Cynthia F Collado
(74) *Attorney, Agent, or Firm*—Aaron Nerenberg

(57) ABSTRACT

A mid-wheel drive power wheelchair for use by handicapped and disabled persons is provided having a frame, a seat supported by the frame, a pair of drive wheels supported on the frame under the seat, drive means for causing rotation of the drive wheels, power means for supplying power to the drive means, a rearward idler wheel, a forward anti-tip device and a resilient suspension supporting the forward anti-tip device, the suspension being attached to the drive means rearward of the front portion of the frame.

44 Claims, 15 Drawing Sheets

CURB-CLIMBING POWER WHEELCHAIR

CROSS-REFERENCE TO RELATED PATENT APPLICATIONS

This patent application is based on a provisional U.S. patent application Ser. No. 60/530,041, filed Dec. 15, 2003, in the name of Walter E. Schaffner, entitled CURB-CLIMBING POWER WHEELCHAIR, the benefit of the filing date of which is hereby claimed under 35 U.S.C. §120.

BACKGROUND OF THE INVENTION

1. Field of the Invention

This invention relates to wheelchairs, particularly to power wheelchairs with enhanced curb-climbing ability for use by handicapped and disabled persons.

2. Description of the Prior Art

Power wheelchairs, and particularly mid-wheel drive power wheelchairs, are known and have been the subject of increasing development efforts to provide handicapped and disabled persons with independent mobility to assist them in leading more normal and active lives. Examples of mid-wheel drive power wheelchairs are found in U.S. Pat. Nos. D397,645; D404,693; 5,944,131; 6,129,165; 6,176,335; 6,186,252; 6,196,343; 6,199,647; and 6,341,657. While the mid-wheel drive power wheelchairs described in these patents have improved the state of the power wheelchair art over the prior motorized power wheelchairs, they all suffer from a common deficiency. They all include a resilient suspension, which is located forward of the front portion of the power wheelchair frame, for supporting the forward anti-tip idler wheels. This results in interference with the legs and feet of the handicapped person riding in the power wheelchair causing the legs and feet to be unnecessarily forwardly extended, and can result in injury to the handicapped person under certain conditions. Bumping of the users' feet due to the increased forward extension and pinching of their legs can occur because of the close proximity of their legs to the suspension assembly.

An example of an improved mid-wheel drive power wheelchair that overcomes these deficiencies is found in U.S. patent application Ser. No. 10/396,052 filed Mar. 25, 2003, the disclosure of which is incorporated herein by reference. In this improved design the resilient suspension system for supporting the forward anti-tip idler wheels is located no further forward than the front portion of the power wheelchair frame.

In prior designs of mid-wheel drive power wheelchairs the forward anti-tip idler wheel(s), castor wheel(s) or other anti-tip devices are resiliently mounted to the frame and/or rigidly connected to the drive motor(s). Any design without a resilient suspension on the anti-tip device results in a compromise in choosing between the possibility of forward tipping of the power wheelchair or the ability of the power wheelchair to climb over obstacles.

A resilient suspension for the anti-tip device is therefore preferred in mid-wheel design power wheelchairs. In some models it is also preferred to have the anti-tip device attached to the drive wheel to assist the power wheelchair in climbing over obstacles. In these designs the drive motors are preferably pivotally connected to the frame and are controlled by a resilient suspension attached between the drive motor and the frame. This suspension design also is dictated by the weight of the power wheelchair and the wheelchair occupant.

In prior designs where the anti-tip device is connected to the motor using a resilient suspension, this resilient suspension controls the movement of the anti-tip device which is indirectly connected to the power wheelchair frame. In this configuration upward movement of the anti-tip device compresses the resilient suspension. Compressing the resilient suspension reduces the force applied that causes movement of the drive motor. Additionally, it takes more force to raise the anti-tip device or lower the drive wheel. In this configuration the drive motor and anti-tip device cannot move independently.

Handicapped persons needing power wheelchairs have a variety of problems with their legs and feet, such as having little or no sensation in them. Having the suspension assemblies, consisting of spring/strut combinations that are designed to compress and expand, in proximity to the user's legs could cause pinching of the clothing or skin of the user. In addition the anti-tip arm on the prior power wheelchairs forces the spring and strut upward and could cause injury to the user. The potential liability for such injuries can be substantial.

Even if the resilient suspension assemblies are covered by fenders having integral bumper members lying over and protecting them, the handicapped person's legs and feet must necessarily be extended forward and/or inward to accomodate the space taken up by the suspension assemblies. This causes the overall length of the power wheelchair occupant's footprint to increase, resulting in a greater turning radius and less maneuverability in tight areas and making the power wheelchair less practical. There are also limitations placed on the hardware available that can be used to support the person's legs and feet due to the suspension assemblies being positioned forward of the front portion of the power wheelchair frame. The width of the footrest that can be folded upward between the assemblies is decreased, and the flexibility in mounting individual leg rests with regard to the height and angle is also decreased.

Another deficiency of the prior power wheelchairs involves the aesthetics. Several components of the prior power wheelchairs such as the moving springs and spring struts must be covered by the body and fenders that extend beyond the front of the frame. These body/fender components are generally molded from plastic in an injection molding or vacuum forming process, and the required forward extending fenders must be stretched at the corners, thus presenting problems in the manufacturing process. A more aesthetically pleasing, as well as functional, body would extend only as far as the front portion of the power wheelchair frame. Such a streamlined body would be easier to manufacture because of fewer curves and radiuses.

SUMMARY OF THE INVENTION

These and other deficiencies of the prior art are overcome by the present invention. In one of its aspects this invention provides a power wheelchair having a frame, a seat supported by the frame, a pair of drive wheels supported on the frame and rotatable about transverse axes below a central portion of the seat, drive means for causing rotation of the drive wheels, the drive means being operatively connected to the frame at a first location and pivotally connected to the frame at a second location, the first and second locations being no further forward than the front portion of the frame, power means for supplying power to the drive means, control means for controlling the rotation of the drive wheels by the drive means, at least one rearward idler wheel mounted for rotation about a horizontal axis and supported for rotational movement about a vertical axis, at least one anti-tip device positioned forward of the drive wheels and the frame, the anti-tip device being positioned off the ground when the drive wheels and the rearward idler wheel are in their normal ground-engaging position on level ground, and a resilient suspension supporting the forward anti-tip device, the suspension being operatively attached to the drive means at a third location no further forward than the front portion of the frame and operatively attached to the frame at a fourth location.

In another of its aspects this invention provides a power wheelchair including a frame, a seat supported by the frame, a pair of drive wheels supported on the frame and rotatable about a transverse axis below a central portion of the seat with the drive wheel axis and seat positioned so that the drive wheel axis is forward of the cranial center of perception of the wheelchair operator, drive means for causing rotation of the drive wheels, the drive means being operatively connected to the frame at a first location and pivotally connected to the frame at a second location, the first and second locations being no further forward than the front portion of the frame, control means for controlling the rotation of the drive wheels by the drive means, at least one rearward idler wheel mounted for rotation about a horizontal axis and supported for rotational movement about a vertical axis, at least one anti-tip device positioned forward of the drive wheels and the frame, the anti-tip device being positioned off the ground when the drive wheels and the rearward idler wheel are in their normal ground-engaging position on level ground, and a resilient suspension supporting the forward anti-tip device, the suspension being operatively attached to the drive means at a third location no further forward than the front portion of the frame and operatively attached to the frame at a fourth location.

In yet another of its aspects this invention provides a power wheelchair including a frame, a seat preferably having cushion and back portions, with the seat being mounted on the frame, a pair of drive wheels supported on the frame and rotatable about transverse axes below a portion of the seat cushion supporting a chair occupant's thighs, with the drive wheel axes being positioned forward of the cranial center of perception of the chair occupant, drive means for causing rotation of the drive wheels, the drive means being operatively connected to the frame at a first location and pivotal connected to the frame at a second location, the first and second locations being no further forward than the front portion of the frame, control means for controlling the rotation of the drive wheels by the drive means, at least one rearward idler wheel mounted for rotation about a horizontal axis and supported for rotational movement about a vertical axis, at least one anti-tip device positioned forward of the drive wheels and the frame, the anti-tip device being positioned off the ground when the drive wheels and the rearward idler wheel are in their normal ground-engaging position on level ground, and a resilient suspension supporting the forward anti-tip device, the suspension being operatively attached to the drive means at a third location no further forward than the front portion of the frame and operatively attached to the frame at a fourth location.

In still another of its aspects this invention provides a power wheelchair having a frame, a seat supported by the frame, a pair of drive wheels supported on the frame and rotatable about transverse axes below a central portion of the seat, drive means for causing rotation of the drive wheels, the drive means being operatively connected to the frame at a first location and pivotally connected to the frame at a second location, the first and second locations being no further forward than the front portion of the frame, power means for supplying power to the drive means, control means for controlling the rotation of the drive wheels by the drive means, at least one rearward idler wheel mounted for rotation about a horizontal axis and supported for rotational movement about a vertical axis, at least one anti-tip device positioned forward of the drive wheels and the frame, the anti-tip device being in engagement with the ground when the drive wheels and the rearward idler wheel are in their normal ground-engaging position on level ground, and a resilient suspension supporting the forward anti-tip device, the suspension being operatively attached to the drive means at a third location no further forward than the front portion of the frame and operatively attached to the frame at a fourth location.

DETAILED DESCRIPTION OF THE INVENTION

Figure 1:
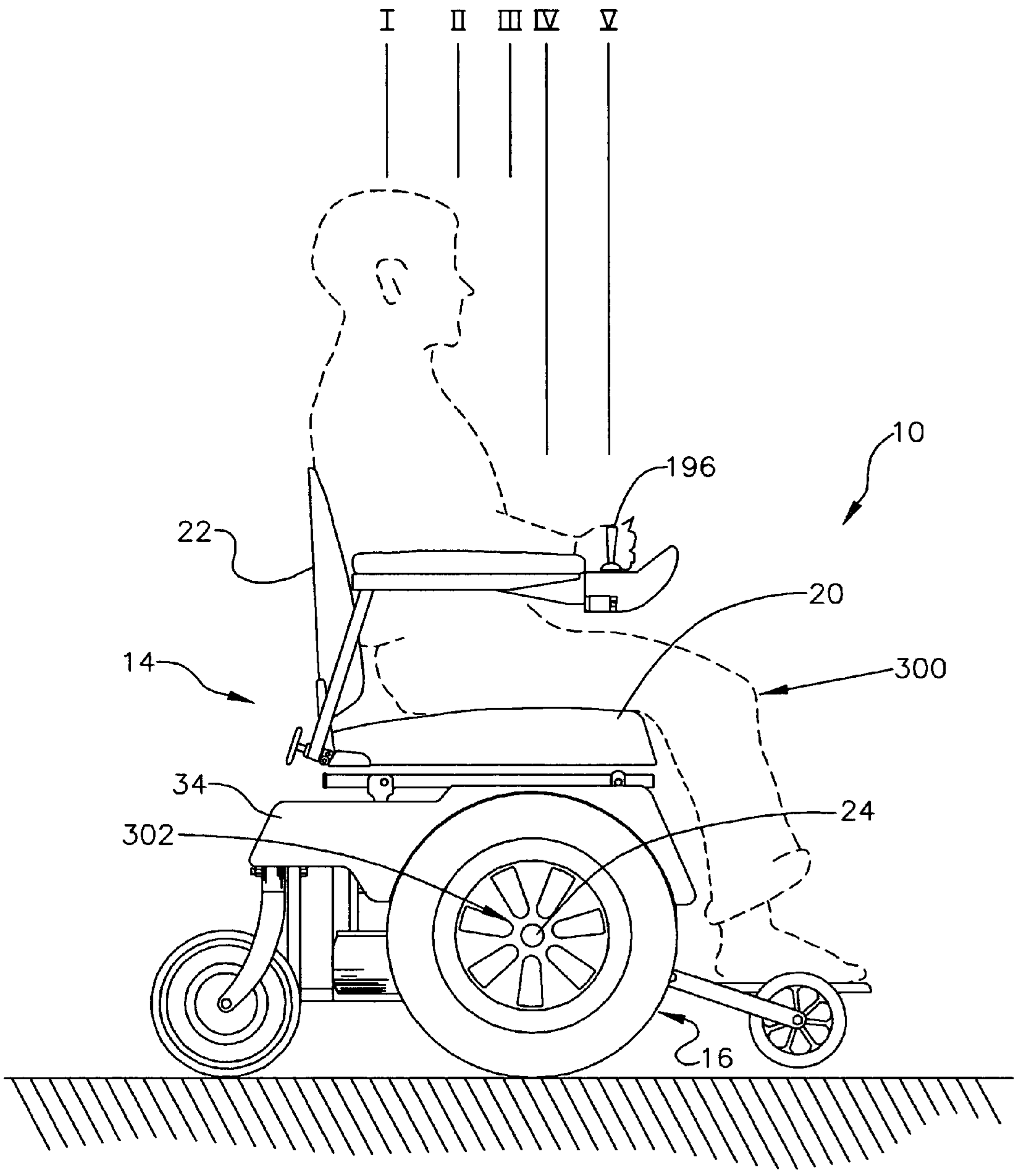
FIG. 1 is a right side elevation of a power wheelchair according to the present invention with the wheelchair user depicted in dotted lines in an erect seated position.

Referring to the drawings in general and to FIGS. 1 through 6 in particular, where like numerals identify like elements, a power wheelchair illustrating certain aspects of the invention is shown and is designated generally by the numeral 10. Power wheelchair 10 includes a frame designated generally as 12, and a seat designated generally as 14 supported by frame 12. A pair of drive wheels, each of which is designated generally as 16, are rotatably connected to frame 12 and are rotatable about transverse axes under a central portion of seat 14.

As fully described in U.S. Pat. No. 5,944,131, the disclosure of which is incorporated herein by reference, human beings have a center of perception located within the skull, referred to herein as the "cranial center of perception." This cranial center of perception is generally perceived by a person to be located behind one's eyes, centrally located from left to right within the head and at a front to back location approximately even with the ear opening. The cranial center of perception provides a point of reference for all human beings respecting body movement, and such movement is found to be easier when it is within the cranial center of perception.

It is therefore desirable to have a relatively stationary cranial center of perception as a reference point for body movement. It is also desirable to have a power wheelchair with the driving axis of the drive wheels substantially under and supporting the weight of the wheelchair operator and with the drive wheel axis ahead of the operator's cranial center of perception and preferably ahead of the operator's eyes, making it easier to maneuver for a disabled or handicapped person. The foregoing defines the center of rotation for a power wheelchair when it is making a U-turn, due to the opposite directions of rotation of the drive wheels with one turning in a forward direction and the other turning in a rearward direction.

Figure 2:
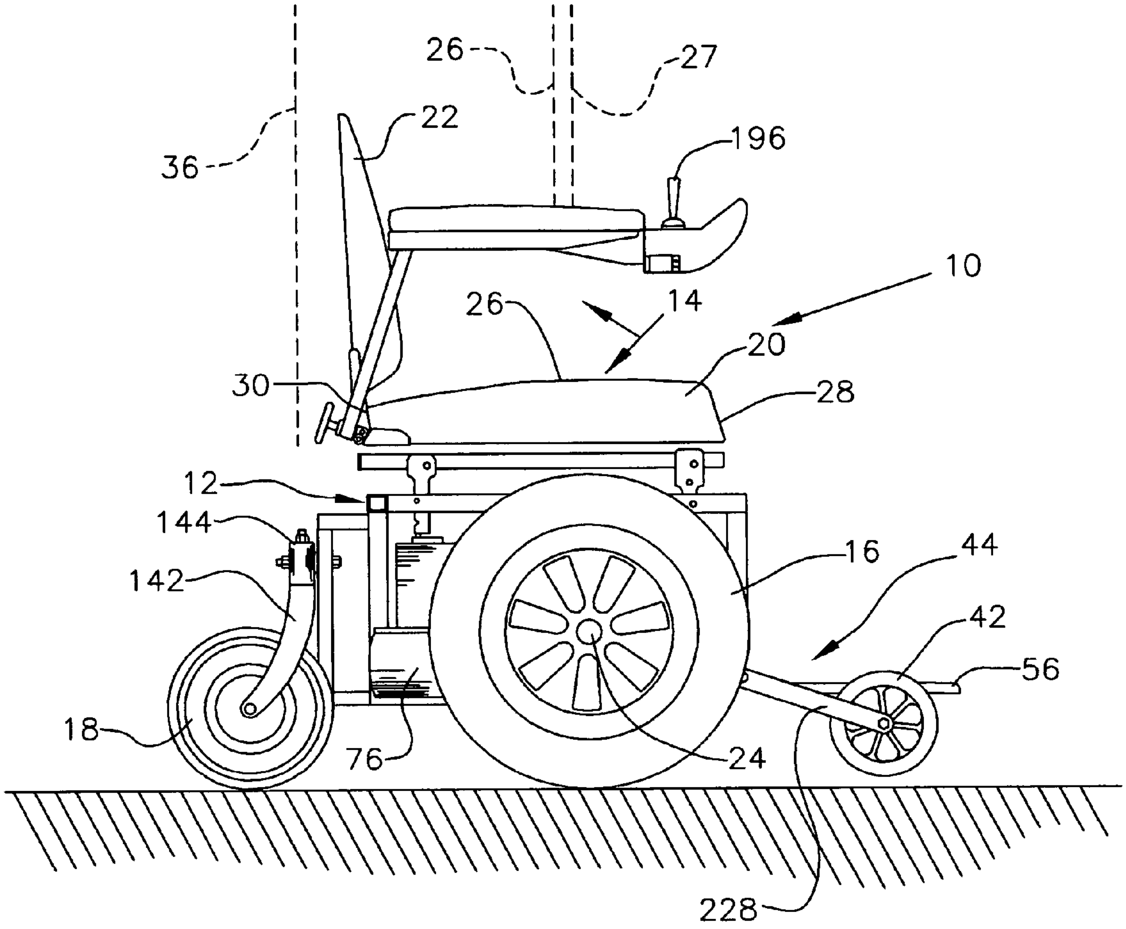
FIG. 2 is a side view of the power wheelchair illustrated in FIG. 1 with the body 21 removed to reveal internal structure and mechanical details.

As illustrated in FIG. 2, seat 14 has a cushion portion 20 which supports the wheelchair occupant's buttocks and thighs. Seat 14 also includes a back portion 22 for supporting the occupant's back. Accordingly, the wheelchair occupant is positioned in a seated upright position when using the wheelchair, as illustrated in FIG. 1. The longitudinal mid-point of seat 14, preferably the longitudinal mid-point of seat cushion 20, is designated as 26. In FIG. 2 the longitudinal mid-point 26 of seat 14 is indicated by both a lead line from an indicator numeral and by a dotted vertical line. The forward longitudinal extremity of seat 14 is designated 28, while the rear longitudinal extremity of seat 14 and specifically seat cushion 20 is designated 30. The axis of rotation of drive wheels 16 is designated 24. The longitudinal location of the axes of rotation of drive wheels 16 is indicated by a dotted vertical lie 27 in FIG. 2.

In this position the wheelchair occupant's cranial center of perception is located above and preferably longitudinally slightly behind the axis of rotation of drive wheels 16. Drive wheels 16 in general, and specifically the axis 24 about which the drive wheels rotate, are below a central portion of seat 14. More specifically, drive wheels 16 and axis 24 are below a central portion of cushion 20. This arrangement results in drive wheel axis 24 being longitudinally just slightly ahead of the occupant's center of cranial perception when the occupant is seated in the wheelchair, as shown in FIG. 1.

As illustrated in the drawings, the vertical axis or turning axis of rotation of the power wheelchair is coincident with the axis of rotation of the drive wheels. Thus, drive wheels 16 can turn the wheelchair about a stationary vertical axis, which intersects the transverse or horizontal axis of rotation of the drive wheels, by having one wheel rotate backwardly while the other wheel rotates forwardly. This causes the wheelchair to turn about a vertical axis that runs through the drive wheel axis. With this sharp turning capability (the turning radius is preferably within the footprint or length of the power wheelchair vehicle), it is desirable for the occupant's eyes to be positioned slightly behind the longitudinal location of the drive wheel axis, or less preferably, with the occupant's eyes essentially at the same longitudinal position as the drive wheel axis.

In FIG. 1 of the drawings an occupant designated generally as 300 is depicted in dotted lines seated in wheelchair 10. The center of gravity of wheelchair 10 is designated generally as 302. The center of gravity has been computed with the wheelchair in an unoccupied condition A series of vertical lines are shown to indicate the relative longitudinal position of parts of wheelchair 10 and occupant 300. These vertical lines are identified with Roman Numerals I through V in FIG. 1. Vertical position line I identifies the longitudinal location of the occupant's cranial center of perception; vertical position line II denotes the longitudinal position of the occupant's eyes; vertical position line III identifies the longitudinal location of the center of gravity 302 of power wheelchair 10; vertical position line IV identifies the longitudinal location of the axis of rotation of drive wheels 16 of power wheelchair 10; and vertical position line V identifies the longitudinal location of the joystick controller operated by the single hand of occupant 300.

As is apparent from the drawings, drive wheels 16 of power wheelchair 10 are connected to frame 12 so that each drive wheel 16 rotates about a transverse axis which is below a portion of seat cushion 20 of seat 14, and specifically below the portion of cushion 20 which supports the power wheelchair occupant's thighs. Drive wheels 16 are rotatable about transverse axes which are slightly forward of the longitudinal mid-point of the wheelchair seat 14, and specifically are rotatable about transverse axes which are slightly forward of the longitudinal mid-point of the seat cushion 20.

Seat 14 is preferably mounted on frame 12 proximate the longitudinal mid-point of frame 12. As is further apparent from the drawings, drive wheels 16 are connected to frame 12 and rotatable with respect thereto about a transverse axis which is under a central portion of frame 12 and is adapted to support seat 14. Drive wheels 16, which are rotatably connected to frame 12, are rotatable about a transverse axis which is preferably under a central portion of seat 14. As illustrated in FIGS. 1 and 2, drive wheels 16 are preferably oriented and positioned with respect to frame 12 so that each axis 24 of drive wheels 16 is preferably between the longitudinal mid-point 26 and the forward longitudinal extremity 28 of seat 14. Most desirably, each axis of rotation of drive wheels 16 is closer to the mid-point 26 than to the longitudinal extremity 28 of seat 14.

Figure 5:
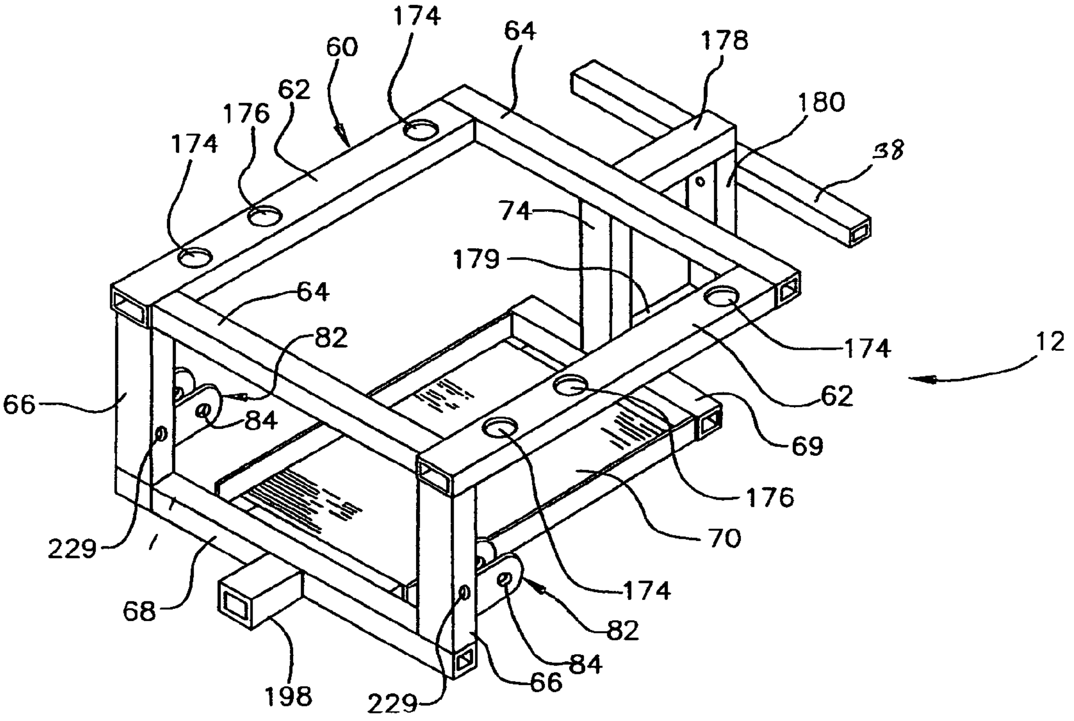
FIG. 5 is an isometric view of the frame of the power wheelchair illustrated in the previous four drawing figures.

Frame 12 is illustrated isometrically in FIG. 5 and has an upper rectangular frame portion designated generally 60, which includes left and right longitudinally extending tubular upper members 62 and forward and rear transversely extending tubular upper members 64. Members 62 and 64 are preferably welded together. As illustrated in FIG. 5, frame 12 is preferably fabricated of hollow tubular rectangular cross-section steel members which are welded together.

Frame 12 further includes a pair of forward vertically downwardly extending members 66 which are preferably welded to and extend downwardly from forward extremities of longitudinally extending tubular upper members 62, as illustrated in FIG. 5. A transversely extending forward lower cross-member 68 is preferably welded to lower extremities of downwardly extending members 66 and extends therebetween. Preferably welded to and extending vertical downwardly from the center of a rear transversly extending tubular upper member 64 is a rear vertically downwardly extending member 74 forming a portion of frame 12.

Figure 3:
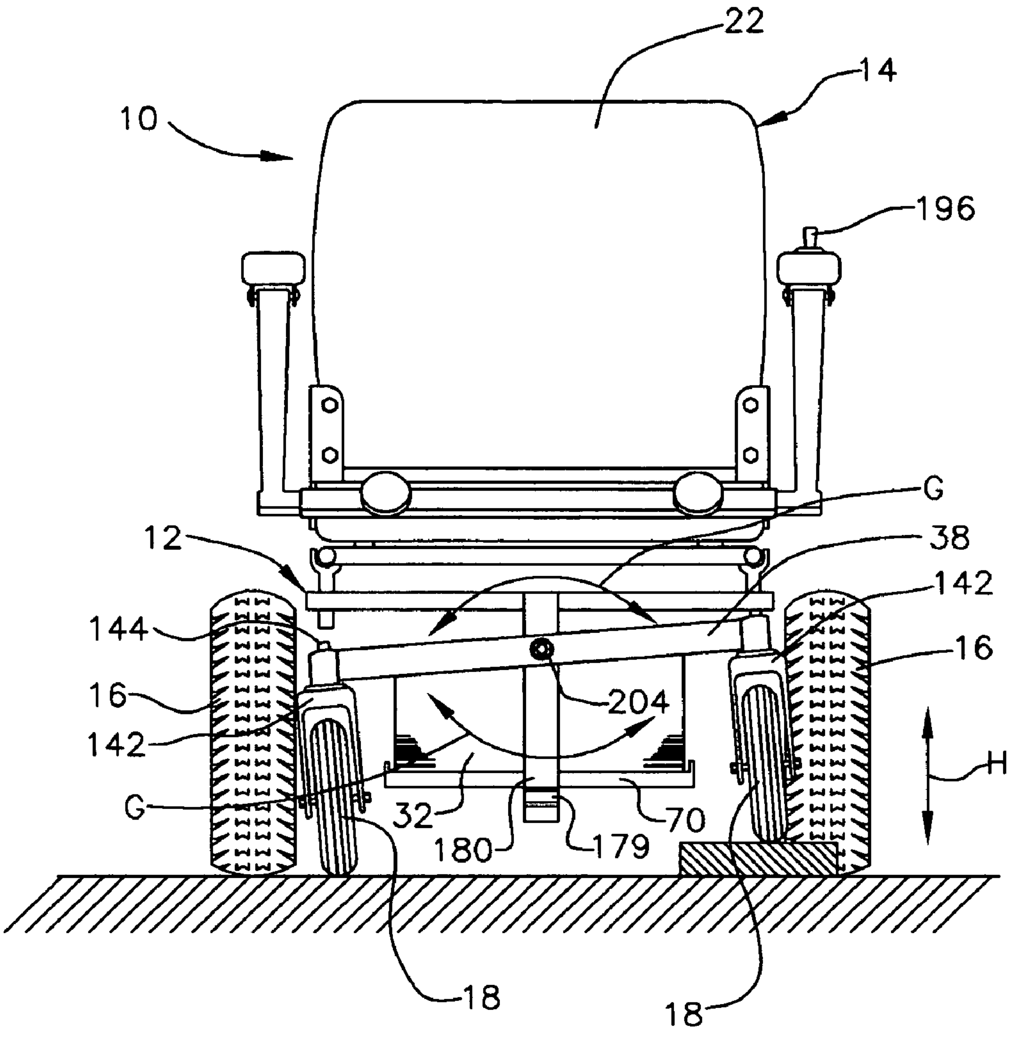
FIG. 3 is a rear view of the power wheelchair illustrated in FIGS. 1 and 2 with the body similarly removed to reveal internal structure and mechanical details.

A pan 70 for carrying electromechanical means to provide power to the motors rotating drive wheels 16, in the form of one or more batteries 32, as illustrated in FIG. 3, is preferably welded along its forward edge to forward transversely extending lower cross-member 68. A rear transversely extending lower cross-member 69 is welded to the lower extremity of rear downwardly extending member 74. The rear edge of pan 70 is welded to the forward facing surface of rear transversely extending lower cross-member 69, which is of a length equal to the width of pan 70; rear transversely extending lower cross-member 69 is not as long in the transverse direction as transversely extending cross-members 64 and 68.

Longitudinally extending tubular upper members 62 preferably have apertures 174 formed therein, preferably by drilling or stamping. Apertures 174 receive front and rear upwardly extending seat support members which provide for manual height and tilt adjustment of the power wheelchair. Between apertures 174 in longitudinally extending tubular upper members 62 are apertures 176 which are provided for mounting a spring-shaft portion of the independent drive wheel suspension means of power wheelchair 10.

Frame 12 further includes upper and lower longitudinally extending central tubular members 178 and 179, respectively. Upper member 178 is preferably welded to and extends rearwardly from the center of rear upper transversely extending tubular member 64. Lower member 179 is preferably welded to and extends rearwardly from the center of the rearwardly facing surface of rear transversely extending lower cross-member 69, immediately below the point of welding connection between rear vertically downwardly extending member 74 and rear transversely extending lower cross-member 69.

Extending vertically between upper and lower longitudinally extending central tubular members 178 and 179 is outboard vertically extending tubular member 180, which is preferably secured to the rear extremities of longitudinally extending members 178 and 179 by welding. Frame 12 further includes a longitudinally extending forward tubular member 198 which is secured to transversely extending lower forward cross-member 68 preferably at the center thereof and preferably by welding.

Frame 12 also preferably includes a pair of eye portions designated generally 82 in FIG. 5 which preferably consist of a pair of parallel plates affixed to rearwardly facing surfaces of respective vertically downwardly extending forward members 66. The plates constituting eye portions 82 include aperatures 84 formed therein, where aperatures 84 are aligned in respective ones of plates forming eye portions 82 so that each pair of plates may receive shafts for independent suspension of drive wheels 16 from eye portions 82 as described below. Eye portions 82, specifically the parallel plate portions thereof are preferably formed from single pieces of metal by bending the pieces of metal into a U-shaped bracket where the upstanding portions of the "U" define the plates of eye portions 82. The preferred one-piece, U-shaped bracket construction of eye portion 82 is visible in FIG. 4.

Pan 70 preferably is welded to to a forward portion of cross-member 69, which preferably is welded to rear vertically downwardly extending member 74 as well as to a rear portion of transversely extending lower tubular cross-member 68. The preferably welded, box-like construction of frame 12, as illustrated in FIG. 5, provides a rigid, high strength frame for power wheelchair 10.

Power wheelchair 10 further includes at least one battery designated generally as 32 carried on pan 70 of frame 12, as illustrated in FIG. 3. Power wheelchair 10 also includes motors 76 powered by one or more batteries 32 for driving drive wheels 16. Each drive wheel 16 preferably has a separate drive motor 76 associated therewith, as illustrated in FIG. 4.

Figure 4:
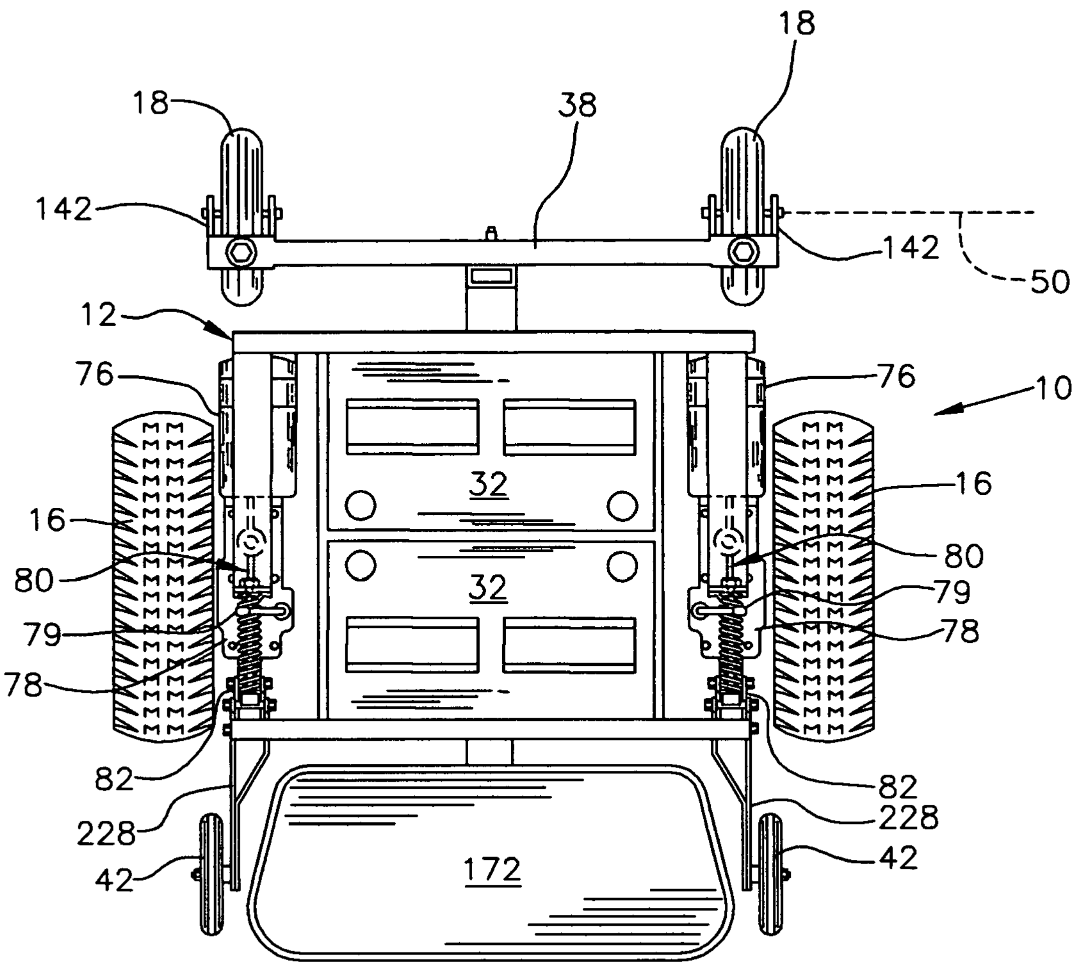
FIG. 4 is a top view of the power wheelchair illustrated in FIGS. 1, 2 and 3 with the seat and body removed along with a portion of the frame to reveal internal structure and mechanical details.

As best illustrated in FIGS. 3 and 4, power wheelchair 10 further includes a pair of idler wheels 18, which are the rear ground-engaging wheels of power wheelchair 10. Drive wheels 16 are the forward ground-engaging wheels of power wheelchair 10. In a preferred embodiment of the invention rear ground-engaging wheels 18 are caster-type wheels. Although two idler wheels 18 are illustrated in the drawings in a preferred embodiment of the invention, it should be understood that one idler wheel 18 could be used in another embodiment (not shown).

The configuration illustrated in FIGS. 1 through 5 results in the positioning of a large amount of total chair and passenger weight over drive wheels 16, which provides several benefits. Overall traction is increased leading to better straight line stability, maneuverability and obstacle-climbing ability. This results in increased overall capability and usability of power wheelchair 10. Increased traction further results in extremely accurate response by the power wheelchair to the control joystick 196 inputs provided by the wheelchair user. This translates into more predictable and positive handling and a much faster learning curve for a new power wheelchair user. Additionally, and most important from a safety standpoint for handicapped and disabled users, with increased traction deceleration is more positive and more predictable.

Yet another benefit of the geometry and configuration of the components in the power wheelchair according to the present invention is an extremely tight turning radius. This allows the user to gain access to and turn around in confined areas such as those encountered in hallways, bathrooms, kitchens, office areas and narrow aisles. In a preferred embodiment of the invention, power wheelchair 10 has an extremely small footprint.

As illustrated in FIG. 4, idler wheels 18 located at the rear of power wheelchair 10 are mounted to frame 12 and are pivotable about vertical axes designated as 36 in FIG. 2. Idler wheels 18 are not powered and are desirably caster-type wheels. Idler wheels 18 are connected to frame 12 behind drive wheels 16 and, preferably, behind seat 14. As illustrated in FIG. 3, rear idler wheels 18 are connected to a transverse beam 38 via U-shaped spindles 142 which connect to transverse beam 38 via conventional bearing assemblies 144. With this arrangement U-shaped spindles and hence rear idler wheels 18 are pivotable about vertical axes 36 when power wheelchair 10 turns and/or one of rear idler wheels 18 encounters an obstacle, such as illustrated in FIGS. 2 and 3. Rear idler wheels 18 are rotatably mounted within U-shaped spindles 142 for rotation within the spindles about horizontal axes 50, as illustrated in FIG. 4.

As illustrated in FIG. 3, transverse beam 38 is pivotally connected to frame 12, specifically to the upper portion of outboard vertically extending tubular rear frame member 180. The point of pivotal connection of transverse beam 38 to vertically extending tubular rear frame member 180 is designated 204. Pivotal connection provided at 204 is effectuated using conventional bearings together with a pin journaled in the bearing for pivotally connecting beam 38 to vertically extending frame member 180. Member 180 extends upwardly from a lower longitudinally extending frame rear extension member 179, which in turn extends rearwardly from a rear transversely extending lower cross-member 69, as illustrated in FIG. 5.

Pivotal mounting of transverse beam 38 to vertically extending rear frame member 180 provides a smoother ride in the event power wheelchair 10 encounters a bump. As illustrated in FIG. 3, where the right hand one of rear idler wheels 18 has been shown encountering an obstacle, as right hand idler wheel 18 rides over the obstacle, beam 38 rotates about pivotal connection 204 as indicated by double ended arrows G in FIG. 3. Vertical displacement of right hand idler wheel 18 is depicted by double ended arrows H in FIG. 3, where this displacement is effectuated by idler wheel 18 encountering the obstacle.

As illustrated in FIG. 4, power wheelchair 10 includes two motors 76 for driving respective drive wheels 16. These motors are each located within a rigid housing which houses, in addition to a motor 76, a transmission 78 for transferring driving rotation from an output shaft of motor 76 to an associated drive wheel 16. The drive wheel/motor/transmission combination housing is independently suspended from frame 12. Thus each drive wheel 16 is free to move with respect to frame 12 upon encountering an obstacle without the remaining drive wheel 16 moving relative to frame 12. There is no common single axle for drive wheels 16 in a preferred embodiment of the invention; each drive wheel 16 has its own axle.

To facilitate independent suspension of each drive wheel/motor/transmission combination, frame 12 includes eye portions 82 which are preferably fixedly connected, such as by welding, to forward vertical members 66, as illustrated in FIG. 5. As previously described, eye portions 82 have apertures 84 formed therein.

Each motor 76 drives an associated drive wheel 16 via an associated transmission 78. A shift lever 79 extending out of transmission 78 may be rotated to disengage transmission 78, thereby providing free wheel operation of drive wheels 16. When body 34 is in place on frame 12, shift levers 79 protrude through the aperatures in body 34 thereby providing facile switchover from driven to freewheeling operation of drive wheels 16 by the power wheelchair operator merely twisting shift lever 79.

Figure 6:
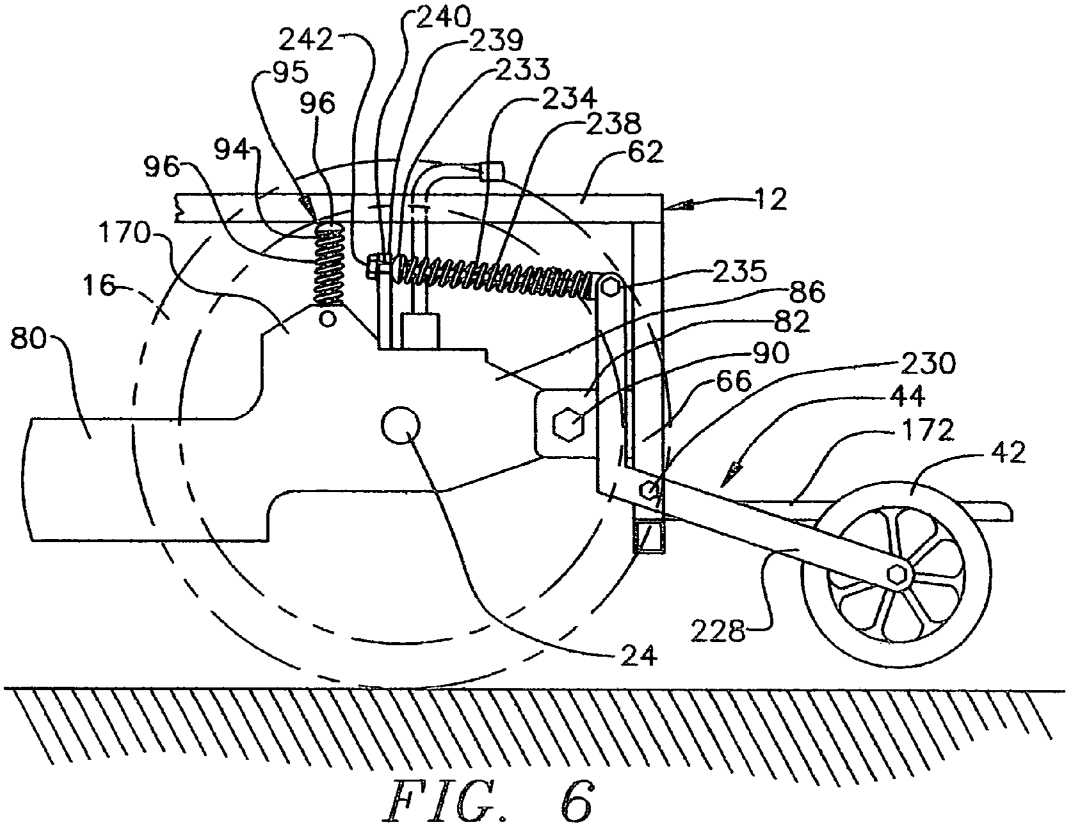
FIG. 6 is a partially broken enlarged side view of the power wheelchair independent drive wheel and anti-tip idler wheel suspension, with the drive wheel shown in phantom.

Motor 76 and transmission 78 are rigidly connected by a motor/transmission housing 80, which includes an ear portion 86 extending forwardly therefrom, as illustrated in FIG. 6. Ear portions 86 (one is not shown in FIG. 6) each include aperatures sized and positioned to be congruent with aperatures 84, as illustrated in FIG. 5, so that the aperatures may be aligned. A pivot pin 90 fits within aligned aperatures 84 and a corresponding aperature (not shown) on ear portion 86 and permits rotation of housing 80, and hence motor 76 and transmission 78 housed therein, relative to frame 12 upon an associated drive wheel 16 encountering an obstacle. Once a drive wheel 16 encounters an obstacle and moves upwardly, housing 80 with motor 76 and transmission 78 therewithin, rotates upwardly about a pivot defined by pin 90 relative to frame 12. Bearings are provided at pin 90 to provide for free rotation of motor/transmission housing 80 relative to frame 12 about pin 90.

Further forming a part of the drive wheel independent suspension apparatus is a shaft-spring combination designated 95 in FIG. 6. A shaft 92 is pivotally affixed to a web 170, preferably formed integrally as part of housing 80. Most preferably, two parallel webs 170 are provided which are longitudinally commonly positioned and transversely aligned such that only a single web 170 is illustrated in FIG. 6. The second remaining web (not shown) is immediately behind the visible web 170 and is spaced therefrom.

The pivotal connection of shaft 92 to web 170 is provided by a shaft (not shown), which extends between web 170 and the second web which is hidden from view. Shaft 92 is preferably secured to a fitting which fits rotatably on the shaft (not shown) extending between web 170 and the second web which is hidden from view. Shaft 92 extends upwardly from connection with web 170 through an aperature, not shown in FIG. 6, formed in the lower surface of upper longitudinally extending member 62 of frame 12. A coil spring 94 is wrapped around shaft 92 and at one end preferably abuts web 170 or is fixedly connected to the shaft or a sleeve about the shaft which extends between web 170 and the second web which is hidden from view in FIG. 6. Spring 94 at its other end abuts, but is not fixed to, the lower surface of longitudinally extending member 62 of frame 12.

The shaft 92 is slideably retained within a fitting in the bottom wall of longitudinally extending tubular member 62. Sliding passage of the shaft through the bottom wall of longitudinally extending tubular member 62 permits the shaft to rise vertical in response to an associated drive wheel 16 encountering an obstacle. A clearance aperature 176 cut in the upper wall of longitudinally extending tubular member 62, immediately above the nut retaining shaft, permits upward movement of shaft 92 upon the associated drive wheel encountering an obstacle without the shaft interfering with frame 12 and particularly with longitudinally extending member 62. The downwardly facing surface of the lower wall of longitudinally extending member 62 preferably contacts a cap 96 that fits over the upper end of spring 94, thereby precluding upward movement of spring 94 and causing it to compress upon upward movement of web 170.

Upon power wheelchair 10 accelerating forwardly, the rear of motor 76 tends to drop and housing 80 tends to pivot downwardly about pivot pin 90 residing in the aperature formed in the eye portion 82 of frame 12 and ear portion 86 of housing 80, respectively. Conversely, as power wheelchair 10 decelerates as its user allows control joystick 196 to return to the center position, the rear of motor 76 tends to move upwardly as housing 80 tends to rotate about the pivot point defined by pivot pin 90.

Power wheelchair 10 further preferably includes a body 34, as illustrated in FIG. 1, which not only provides a decorative, aesthetically pleasing appearance for the power wheelchair, but also protects the wheelchair user from batteries 32 and the electrical connections between batteries 32 and motor 76. Body 34 also provides protection for batteries 32 and, to some extent motors 76, from spills of liquids, bodily fluids and the like.

Body 34 preferably rests directly on frame 12 and is further preferably a single molded piece of high impact plastic that is exceedingly light in weight. Thus, body 34 may be manually directly lifted off of frame 12 once seat 14 has been removed. Because body 34 fits closely about frame 12 and is effectively contoured to the shape of frame 12 and the associated members by which the rear idler wheels 18, the forward anti-tip wheels 42 and the the remaining structure are connected to frame 12, body 34 need not be fixed in any way to frame 12. In a preferred embodiment of the invention power wheelchair 10 operates exceedingly well with body 34 resting on but not secured to frame 12. Preferably, but not necessarily, a material such as Velcro can be inserted between body 34 and flame 12 to limit relative movement between these components of power wheelchair 10.

A footrest 172 is mounted in the front of power wheelchair 10 to member 198 which is welded to transversely extending forward lower cross-member 68 between forward vertically downwardly extending members 66 of frame 12. With forward anti-tip wheels 42, which are mounted on connecting arms 228 as illustrated in FIG. 4, footrest 172 is wider than in previous power wheelchair designs for greater comfort and safety of the user. The position of footrest 172 is adjustable to accomodate power wheelchair users of varying heights. Additionally, the angle of footrest 172 is adjustable to provide maximum foot and leg comfort for the user.

In one preferred embodiment forward anti-tip idler wheels 42 do not normally contact the ground or other surface on which power wheelchair 10 operates. Anti-tip idler wheels 42 are maintained above the ground and provide protection against tipping in the event of forward pitching of power wheelchair 10 due to encounter with an obstacle, traverse of a significant downgrade and the like. The positioning of anti-tip idler wheels 42 off the ground is illustrated in FIGS. 1, 2 and 6.

Forward anti-tip idler wheels 42 are connected to frame 12 via a spring-shaft-arm combination designated generally as 44 in FIGS. 2 and 6. Each spring-shaft-arm combination 44 includes a connecting arm 228, which is pivotally connected at one end thereof to an anti-tip idler wheel 42.

Figure 7:
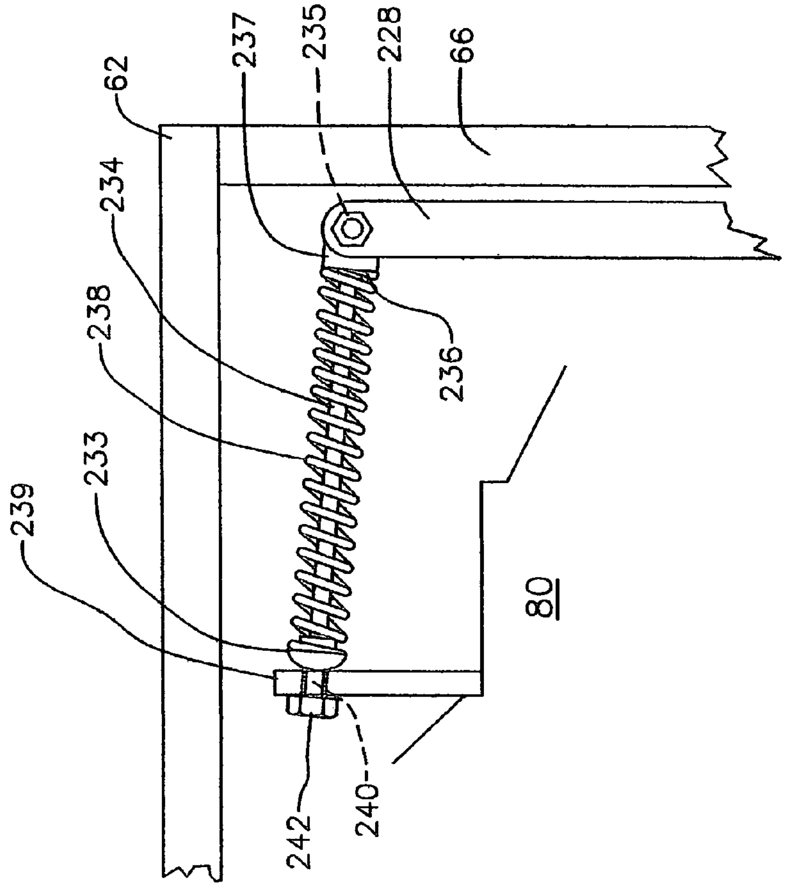
FIG. 7 is a partially broken enlarged side view of the power wheelchair resilient suspension supporting the anti-tip idler wheel showing one embodiment of a spring assembly.

Connecting arms 228 are preferably fabricated as a single member from flat metal, such as steel or aluminum, in the shape of a dog-leg, as illustrated in the side view of FIG. 6. Pivotally attached to each connecting arm 228 at a mounting hole designated as 235 located on arm 228 rearward of the front portion of frame 12 is a shaft 234, as illustrated in FIGS. 6 and 7. Formed at one end of shaft 234 is a cylindrical spring support base 237 which has a shoulder 236 formed therein, the extremity of which is visible in FIG. 7. A cylindrical spring 238 surrounds shaft 234, which is preferably threaded at its other end (not shown) and operatively attached by a nut assembly 242 to a member 239 that is fixedly attached to motor housing 80 through an aperature in member 239 designated as 240.

Prior designs, such as found in U.S. Pat. No. 6,129,165, in which the anti-tip assembly is connected to the motor housing using a resilient suspension, result in the resilient suspension controlling the movement of the anti-tip assembly connected to the frame of the power wheelchair. In such a configuration upward movement of the anti-tip assembly compresses the resilient suspension. Compressing the resilient suspension reduces the force applied to the movement of the drive motor. Additionally, it takes more force to raise the anti-tip assembly or lower the drive wheel. Thus, in this configuration, the drive motor and anti-tip assembly cannot move independently.

In the present invention anti-tip idler wheels 42, or any other anti-tip device used, is pivotally connected to frame 12 by means of a connecting arm assembly (generally designated as 44 in FIG. 6), and the connecting arm assembly is resiliently connected to motor housing 80. The motor housing is pivotally attached to the frame via the second resilient suspension designated as spring-shaft combination 95 in FIG. 6.

In the design according to the present invention any upward movement of the anti-tip assembly creates a force on the resilient suspension. This force is applied to the movement of the motor housing less any resistance offered by the counterbalancing forces from the motor housing 80 or second resilient suspension 95. Any resistance offered by motor housing 80 or second resilient suspension 95 would move the anti-tip assembly or be absorbed by the anti-tip wheels resilient suspension.

One benefit of the design according to the present invention is that any upward movement of the anti-tip assembly adds force in a downward direction to motor housing 80 without reducing force on the anti-tip assembly resilient suspension. This is true unless the motor rotates downward due to the force from the upward movement of the anti-tip assembly, acceleration of the power wheelchair or the effect of weightlessness from gravity, such as by the wheelchair occupant moving his or her center of gravity rearward or the drive wheel encountering a hole, thereby exerting a downward force on motor housing 80 applied by spring 94. This effect is beneficial allowing anti-tip idler wheels 42, or any other anti-tip device used, to move upward more easily for climbing a curb during acceleration. This is an improvement in performance and safety over the prior designs having frame-mounted resilient suspensions controlling the anti-tip idler wheels 42, or any other anti-tip device used.

Figure 10:
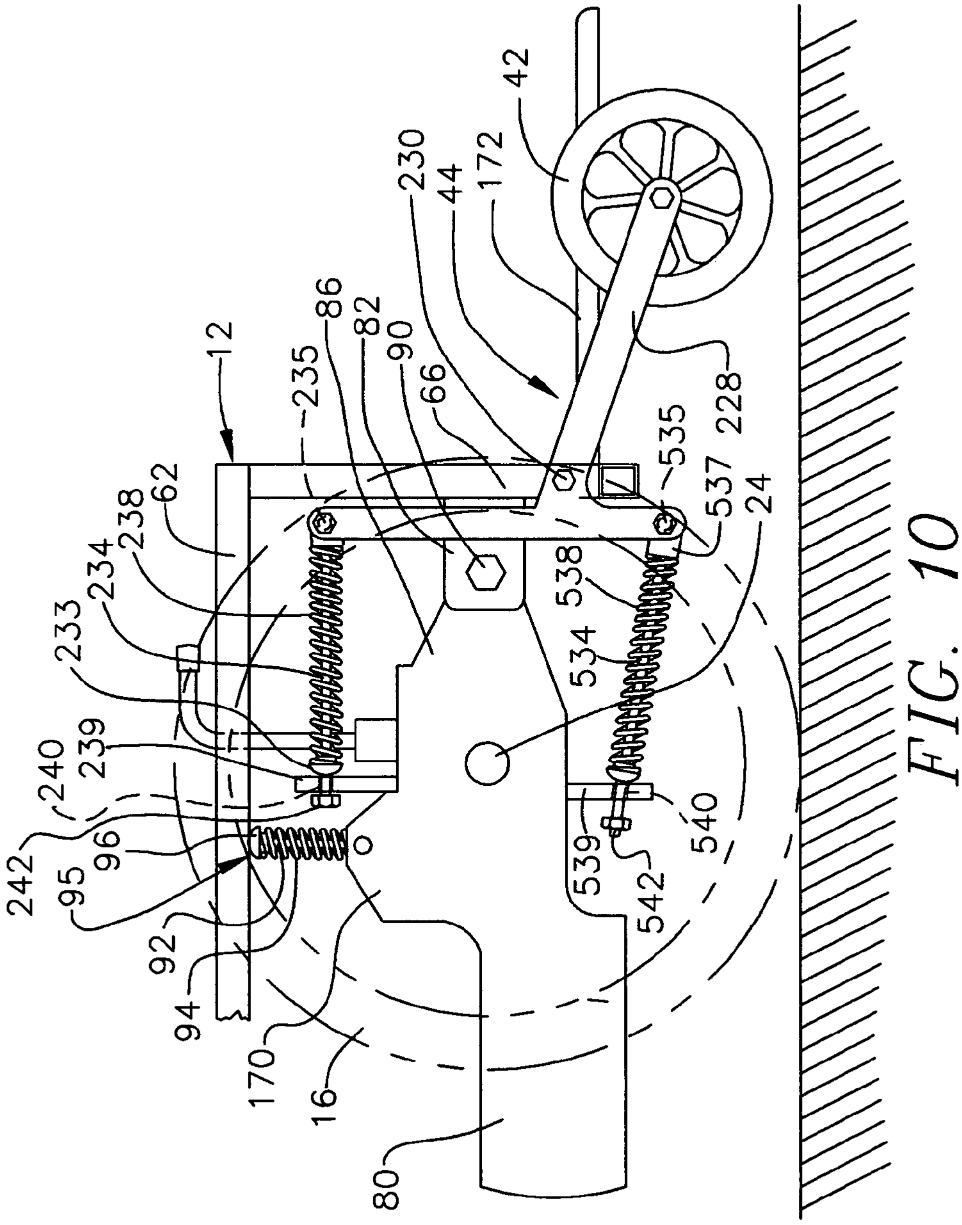
FIG. 10 is a partially broken enlarged side view of the power wheelchair independent drive wheel and alternative dual spring anti-tip idler wheel suspension, with the drive wheel shown in phantom.
Figure 11:
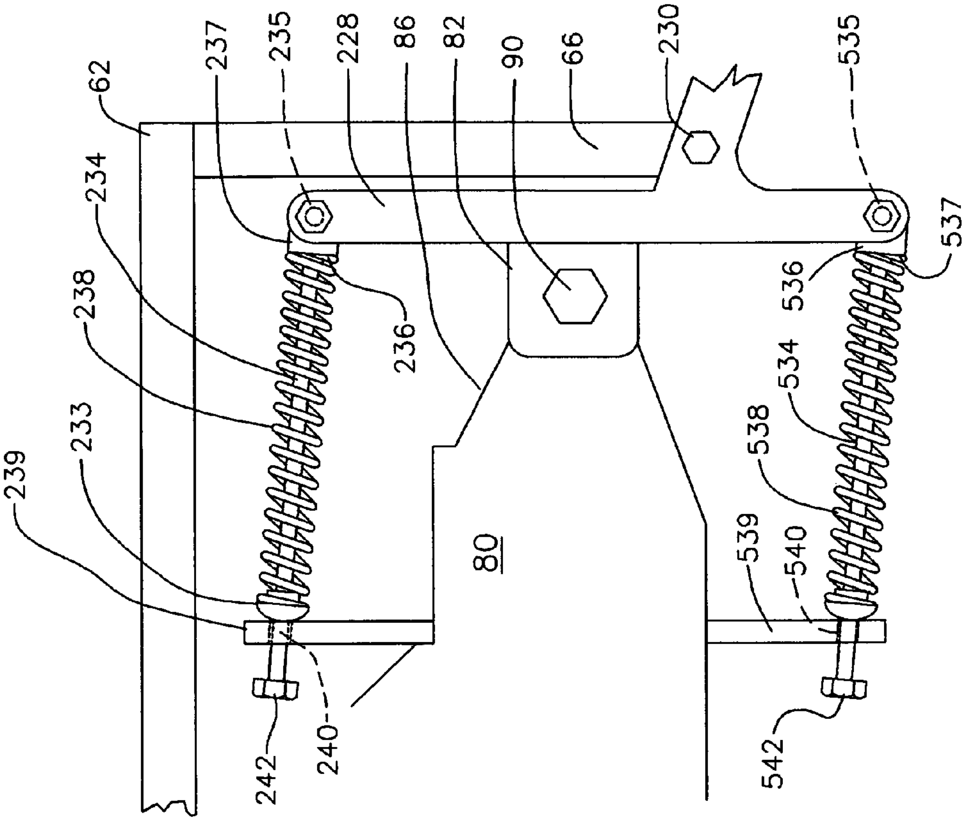
FIG. 11 is a partially broken enlarged side view of a portion of the power wheelchair alternative dual spring anti-tip idler wheel suspension shown in FIG. 10, showing one embodiment of a dual spring assembly.

In another embodiment of the design according to the present invention, the configuration shown in FIG. 6 includes an additional resilient suspension attached preferably below drive motor housing 80, as shown in FIG. 10. In this configuration a second resilient spring-shaft assembly similar to the one shown in FIG. 6 is attached to an extension at the bottom of connecting arm 228. Pivotally attached to the extension of each connecting arm 228 at a mounting hole designated as 535 located on arm 228 rearward of the front portion of frame 12 is a shaft 534, as illustrated in FIGS. 10 and 11. Formed at one end of shaft 534 is a cylindrical spring support base 537 which has a shoulder 536 formed therein, as shown in FIG. 11. A cylindrical spring 538 surrounds shaft 534, which is preferably threaded at its other end (not shown) and operatively attached by a nut assembly 542 to a member 539 that is fixedly attached to motor housing 80 through an aperature in member 539 designated as 540.

This additional resilient suspension applies pressure by downward rotation of the drive motor housing, causing upward movement of the anti-tip wheel assembly by means of connecting arm 44. This additional resilient suspension also allows independent movement of the anti-tip wheel in both directions. Having one end of the drive motor housing resilient suspension attached to the frame results in controllable limits to the movement of the anti-tip assembly and the drive motor housing. In the present configuration resistance to upward movement of the anti-tip wheel assembly applied by the anti-tip resilient suspension can be reduced by downward rotational movement of the drive motor housing 80. This facilitates the power wheelchair climbing curbs more easily. Additionally, in this configuration, upward rotational movement of drive wheels 16 increases the resistance to upward movement of the anti-tip assembly, increasing resistance to forward tipping.

Figure 8:
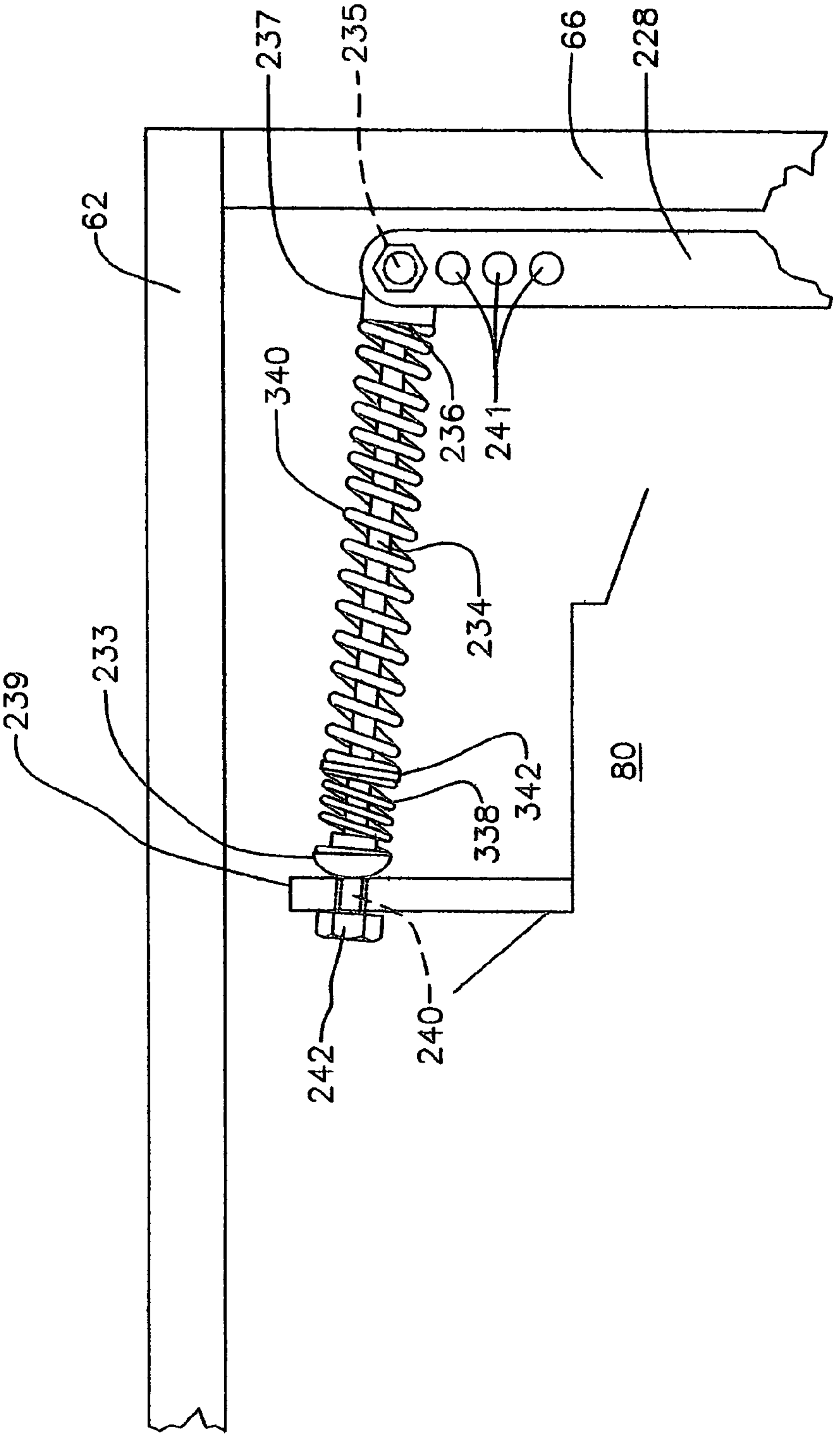
FIG. 8 is a partially broken enlarged side view of the power wheelchair resilient suspension supporting the anti-tip idler wheel showing another embodiment of a spring assembly.

Each connecting arm 228 may contain additional mounting holes designated as 241, as illustrated in FIG. 8, adjacent to mounting hole 235 for the attachment of shaft 234. The number of additional mounting holes 241 may be more or less than the three additional holes shown based on the design parameters of the spring-shaft-arm suspension system. The purpose of these additional holes 241 is to shorten or lengthen the distance from the end of spring 238 adjacent support base 237 to the pivot point of connecting arm 228 on frame 12, thus changing the mechanical advantage applied to spring 238. These additional holes 241 allow for the adjustment of the stiffness of the anti-tip idler wheel 42 resilient suspension system. By using these alternative additional mounting holes 241, the resilient suspension system can be adjusted to make it more or less resilient when anti-tip idler wheels 42 encounter an obstacle. In addition the use of one of these alternative holes 241 allows the positioning of anti-tip idler wheel 42 relative to the ground when power wheelchair 10 is on a flat, level surface.

Figure 12:
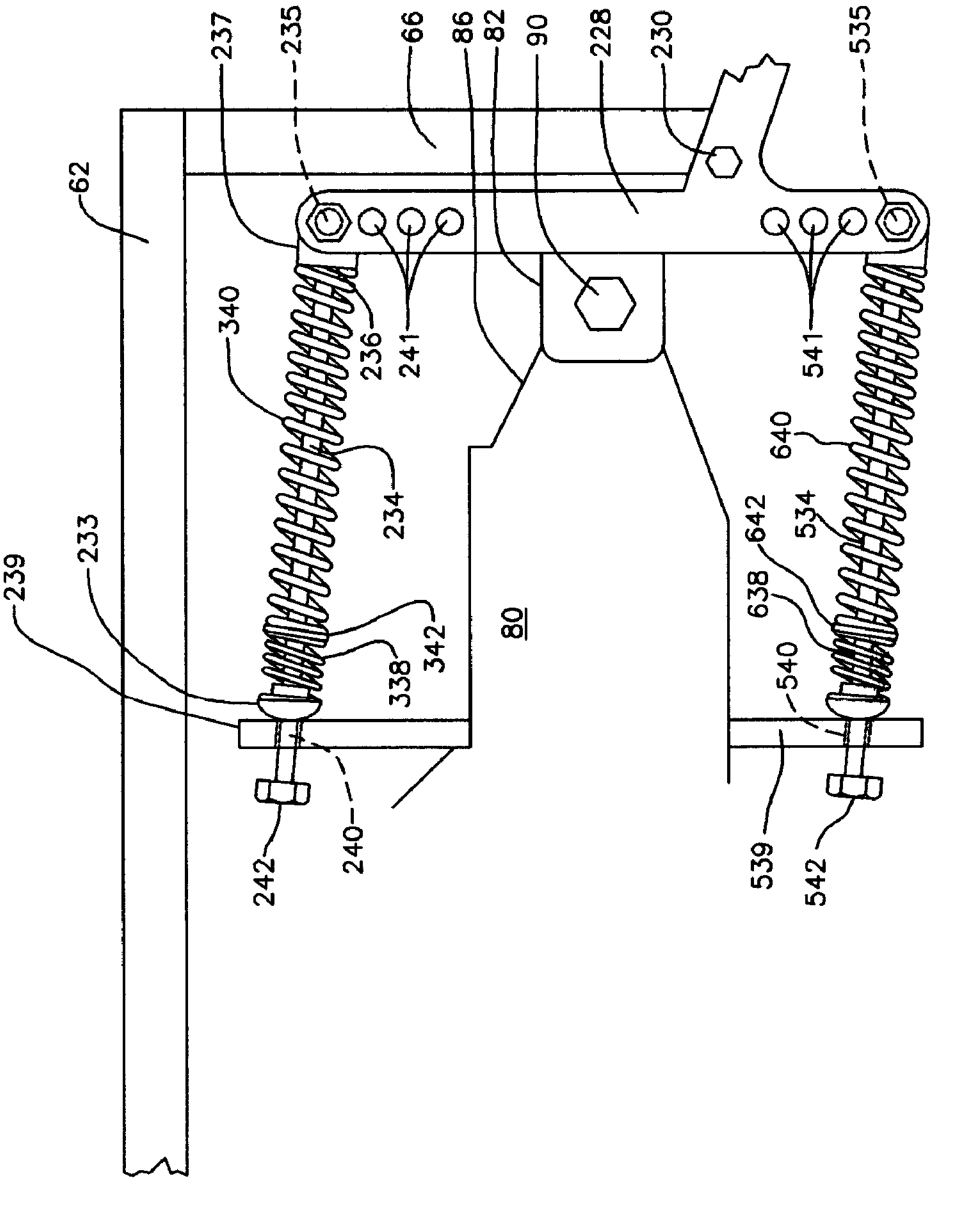
FIG. 12 is a partially broken enlarged side view of the power wheelchair alternative dual spring anti-tip idler wheel suspension shown in FIG. 10, showing another embodiment of a dual spring assembly.

In the embodiment illustrated in FIG. 12, each connecting arm 228 may contain additional mounting holes 541 adjacent to mounting hole 535 for the attachment of shaft 534. Such additional mounting holes provide the same benefits as described hereinabove with regard to additional mounting holes 241.

Connecting arms 228 are preferably pivotally connected to frame 12 at aperatures designated as 229 located on the lower portions of respective downwardly extending members 66. Aperatures 229 are no further forward than, and preferably rearward of the front portion of frame 12, as illustrated in FIG. 5. The pivotal connection is preferably effectuated using nut and bolt assemblies. The nut and bolt pivotal connections of connecting arms 228 to downwardly extending members 66 of frame 12 are depicted schematically as 230 in FIG. 6.

With this arrangement, upon an anti-tip wheel 42 encountering an obstacle (not shown in FIG. 6) or upon power wheelchair 10 pitching forwardly, anti-tip wheels 42 move arcuately, together with connecting arms 228, as they pivot about pivotal connection point 230 relative to frame 12. As an anti-tip wheel 42 and connecting arm 228 pivot about connection point 230, upward movement of the anti-tip wheel 42 connected to the lower dog-leg portion of connecting arm 228 causes the distance between hole 235, near the end of connecting arm 228, and member 239, attached to motor housing 80, to decrease, thereby compressing spring 238.

Compression of spring 238 provides a cushioning effect when anti-tip wheels 42 contact an obstacle or contact the ground due to forward pitching of power wheelchair 10. The resilient suspension of anti-tip wheels 42 provided by spring-shaft-arm combination 44, where this combination is defined by spring 238, shaft 234 and connecting arm 228, connects anti-tip wheels 42 to frame 12 for arcuate upward motion relative to frame 12 upon tipping of power wheelchair 10 or contact of anti-tip wheels 42 with an above-grade obstacle.

Placement of the attachment points of spring-shaft-arm combination 44 no further forward than, or preferably rearward of the front portion of frame 12 results in a number of benefits over existing power wheelchair designs. First, it eliminates interference with the legs and feet of the wheelchair operator resulting in increased safety for the operator; second, it allows more room for the operator's legs and feet resulting in more comfort and support; third, it allows for a more aesthetically pleasing and functional body covering the power wheelchair frame and components; and fourth, it results in a body covering 34 with fewer curves and radiuses making it easier to manufacture. In addition it allows for greater adjustment in control of the mechanical advantage of spring-shaft-arm combination 44. In general, the aforementioned location of the attachment points results in the availability of more options for leg riggings and leg and foot placement on power wheelchair 10.

Nut assembly 242 mounted on the threaded portion of shaft 234 permits selectable compression of spring 238, thereby providing adjustment of the spring force applied to anti-tip wheels 42 to resist arcuate upward movement thereof upon forward tipping of power wheelchair 10 or upon wheels 42 encountering an obstacle. Rotation of nut assembly 242 also adjusts the distance of wheels 42 from the ground on a flat, level surface.

Figure 9:
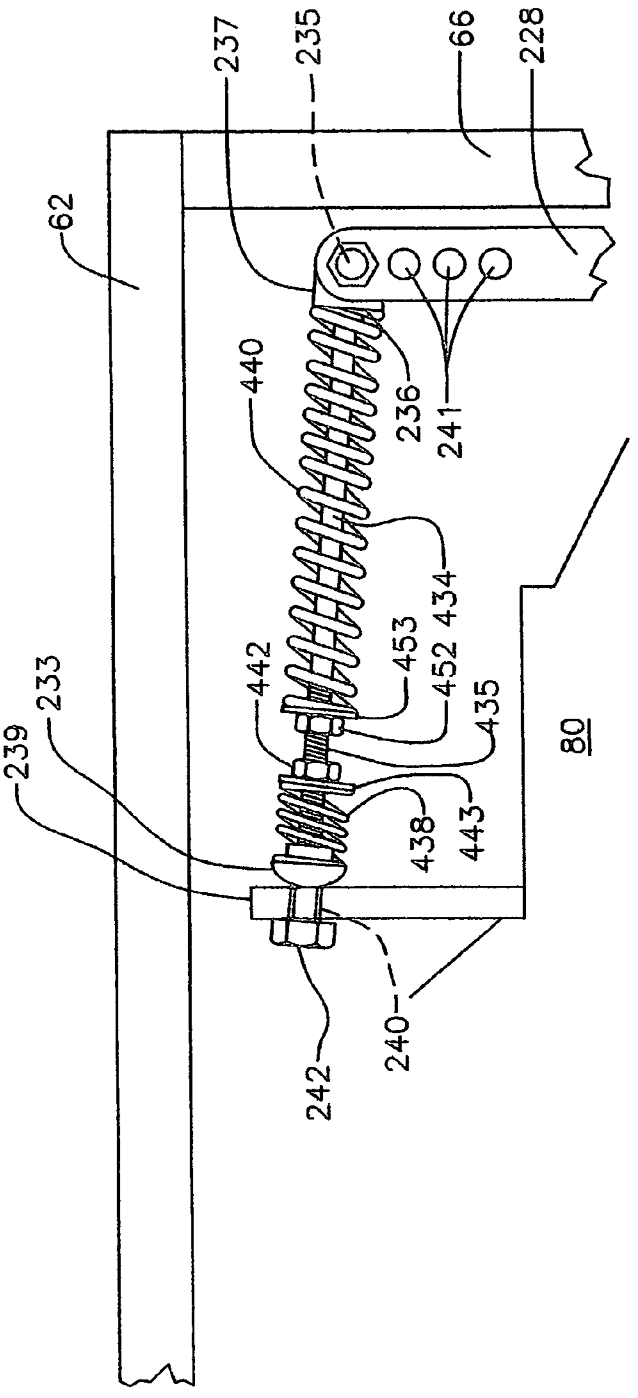
FIG. 9 is a partially broken enlarged side view of the power wheelchair resilient suspension supporting the anti-tip idler wheel showing yet another embodiment of a spring assembly.

Two alternative spring arrangements are illustrated in FIGS. 8 and 9. In both of these alternative arrangements two springs are included in spring-shaft-arm combination 44. Each of the springs employed in a combination 44 has a different spring compression rate or stiffness. The purpose of using two springs of different stiffnesses is to allow easier upward arcuate movement of forward anti-tip idler wheels 42 when a small obstacle is encountered over a short distance of vertical movement. Once the less stiff or weaker spring compresses its maximum amount and can't compress any further it becomes coil bound, and the stronger spring takes over and begins to compress overcoming further tipping of power wheelchair 10. The respective lengths of compression of each spring can be predetermined based on the choice of spring parameters including the length of each spring.

The alternative spring arrangement illustrated in FIG. 8 includes a first spring 338 and a second spring 340 surrounding shaft 234. Spring 338 and spring 340 are separated by a washer 342. With this arrangement, when an anti-tip wheel 42 encounters an obstacle, the less stiff or weaker spring 338 begins to compress until it becomes coil bound. The stiffer spring 340 then takes over and begins to compress, keeping power wheelchair 10 from tipping forward. As previously discussed, each of these springs can be designed to reasonably handle all situations that can forseeably arise in the use of power wheelchair 10.

Another alternative spring arrangement is illustrated in FIG. 9, which includes a first spring 438 and a second spring 440 surrounding a shaft 434. Shaft 434 differs from shaft 234 in the embodiments illustrated in FIGS. 6, 7 and 8 in that shaft 434 includes a threaded section 435. A pair of nut assemblies, including a nut 442 and a washer 443 in the first assembly, and a nut 452 and a washer 453 in the second assembly, are located on threaded section 435 of shaft 434. The first nut assembly, including nut 442 and washer 443, abuts first spring 438 and provides adjustment of the pre-load force on spring 438. The second nut assembly, including nut 452 and washer 453, abuts second spring 440 and similarly provides adjustment of the pre-load force on spring 440. Adjusting the pre-load force increases or decreases the force applied by the spring with this physical arrangement, along with choosing the spring design as previously discussed, the anti-tip idler wheels 42 suspension system can be further fine-tuned to reasonably handle all situations that can forseeably arise in the use of power wheelchair 10.

In the alternate embodiments illustrated in FIGS. 12 and 13, an additional resilient suspension is attached preferably below drive motor housing 80, similar to the embodiment shown in FIGS. 10 and 11. The alternative spring arrangement illustrated in FIG. 12 includes a first spring 638 and a second spring 640 surrounding shaft 534. Spring 638 and spring 640 are separated by a washer 642. With this arrangement, when an anti-tip wheel 42 encounters an obstacle, the less stiff or weaker spring 638 begins to compress until it becomes coil bound. The stiffer spring 640 then takes over and begins to compress, applying upward pressure on anti-tip wheel 42. As previously discussed, each of these springs can be designed to reasonably handle all situations that can forseeably arise in order to increase resistance to forward tipping when using power wheelchair 10.

Figure 13:
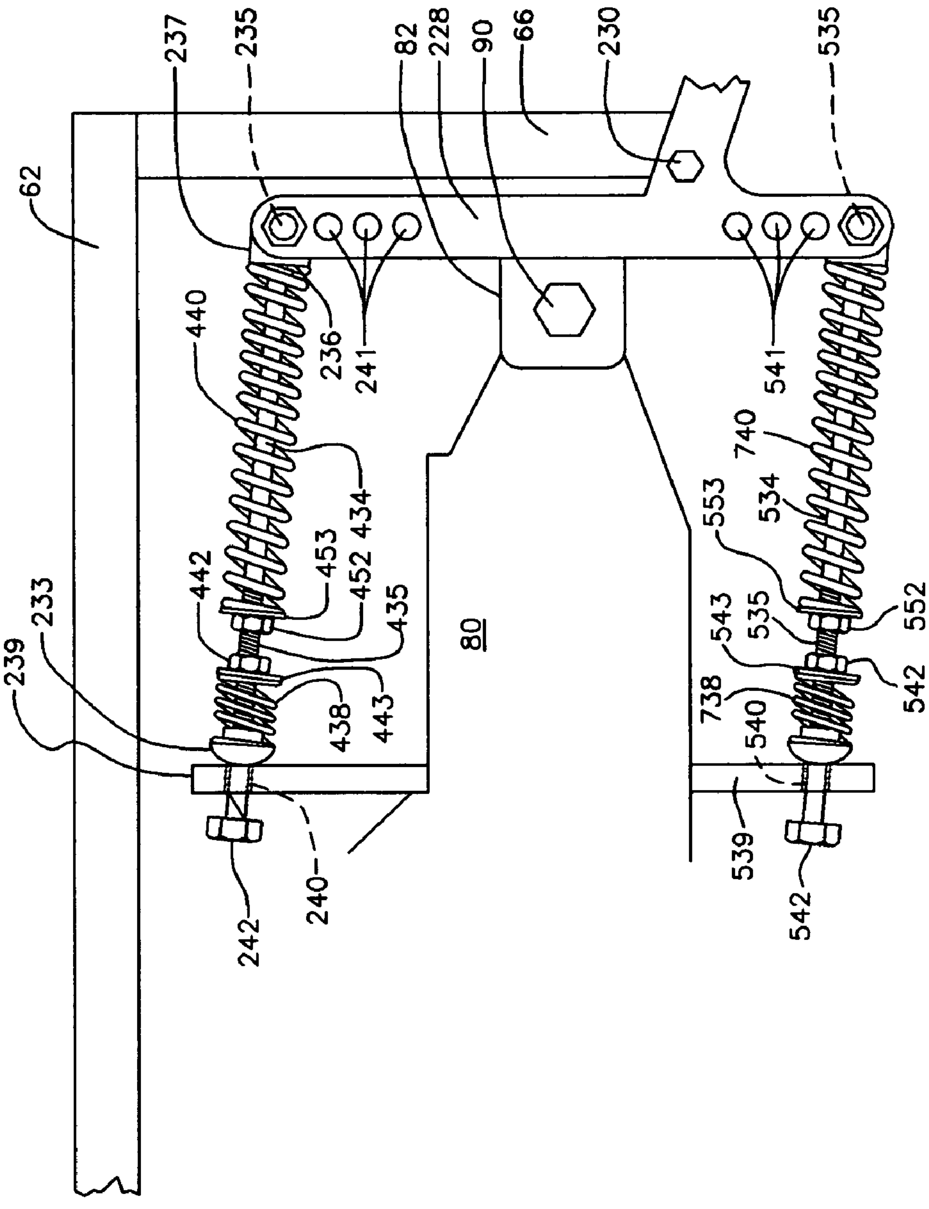
FIG. 13 is a partially broken enlarged side view of the power wheelchair alternative dual spring anti-tip idler wheel suspension shown in FIG. 10, showing yet another embodiment of a dual spring assembly.

Another alternative spring arrangement is illustrated in FIG. 13, which includes a first spring 738 and a second spring 740 surrounding a shaft 534. Shaft 534 differs from shaft 234 in the embodiments illustrated in FIGS. 6, 7 and 8 in that shaft 534 includes a threaded section 535. A pair of nut assemblies, including a nut 542 and a washer 543 in the first assembly, and a nut 552 and a washer 553 in the second assembly, are located on threaded section 535 of shaft 534. The first nut assembly, including nut 542 and washer 543, abuts first spring 738 and provides adjustment of the pre-load force on spring 738. The second nut assembly, including nut 552 and washer 553, abuts second spring 740 and similarly provides adjustment of the pre-load force on spring 740. With this physical arrangement, along with choosing the spring design as previously discussed, the anti-tip idler wheels 42 suspension system can be further fine-tuned to reasonably handle all situations that can forseeably arise in order to increase resistance to forward tipping when using power wheelchair 10.

In both of the alternative spring arrangements illustrated in FIGS. 12 and 13, each spring assembly can be preloaded to the desired force. One spring, having the lowest compression rating, would offer resistance first until it becomes coil bound or its compression rate exceeds the initial rate of the second spring. The lighter spring allows easier upward or downward movement of the anti-tip wheel assembly for overcoming small obstacles such as thresholds or rugs. The heavier spring offers greater resistance to the upward or downward movement of the anti-tip wheel assembly. In the embodiment illustrated in FIG. 13 each of springs 538 and 540, and springs 738 and 740, can be individually preloaded to the desired force by nuts 442 and 452, and nuts 542 and 552, respectively, to effect greater control of the preload to achieve the desired force. This improvement offers greater control of the power wheelchair's anti-tip wheel assembly and drive motor movement, increasing design parameter capabilities and improving safety.

Figure 14:
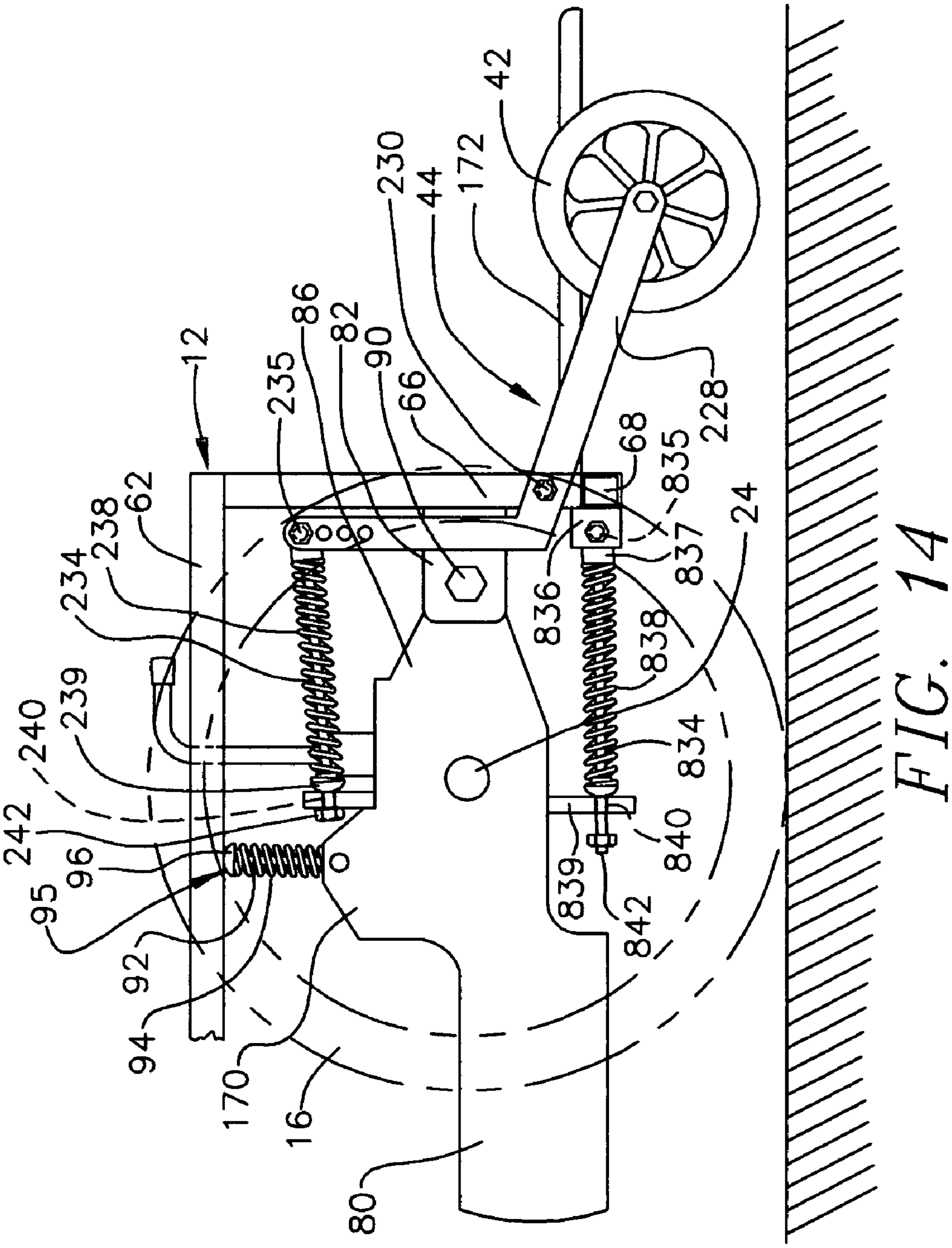
FIG. 14 is a partially broken enlarged side view of the power wheelchair alternative dual spring anti-tip idler wheel suspension shown in FIG. 10, showing still another embodiment of a dual spring assembly.

Still another alternative spring arrangement is illustrated in FIG. 14, which includes a second resilient spring-shaft assembly attached to transversely extending forward lower cross-member 68 at the bottom of vertically downwardly extending forward members 66. Pivotally attached to each spring-shaft assembly at a mounting hole designated as 835 located on a member 836 attached to cross-member 68 rearward of the front portion of frame 12 is a shaft 834, as illustrated in FIG. 14. Formed at one end of shaft 834 is a cylindrical spring support base 837 which has a shoulder (not shown) formed therein, similar to shoulder 536 shown in FIG. 11. A cylindrical spring 838 surrounds shaft 834, which is preferably threaded at its other end (not shown) and operatively attached by a nut assembly 842 to a member 839 that is fixedly attached to motor housing 80 through an aperature in member 839 designated as 840.

This additional resilient suspension offers resistance to upward movement of the anti-tip device and downward rotation of the drive motor. Having one end of the additional resilient suspension attached at the rear of the front portion of the frame offers controllable limits to the movement of the anti-tip device and the drive motor. In this configuration resistance to upward movement of the anti-tip device applied by the resilient suspension is reduced by downward rotational movement of the drive motor. This allows the power wheelchair to climb curbs more easily. Additionally, in this configuration, upward rotational movement of the drive wheels increases resistance to upward movement of the anti-tip device, increasing resistance to forward tipping.

It should be understood that other spring assembly designs, such as the spring assembly designs illustrated in FIGS. 12 and 13, could be substituted for the spring assembly design shown in FIG. 14 without departing from the spirit and scope of the present invention.

Figure 15:
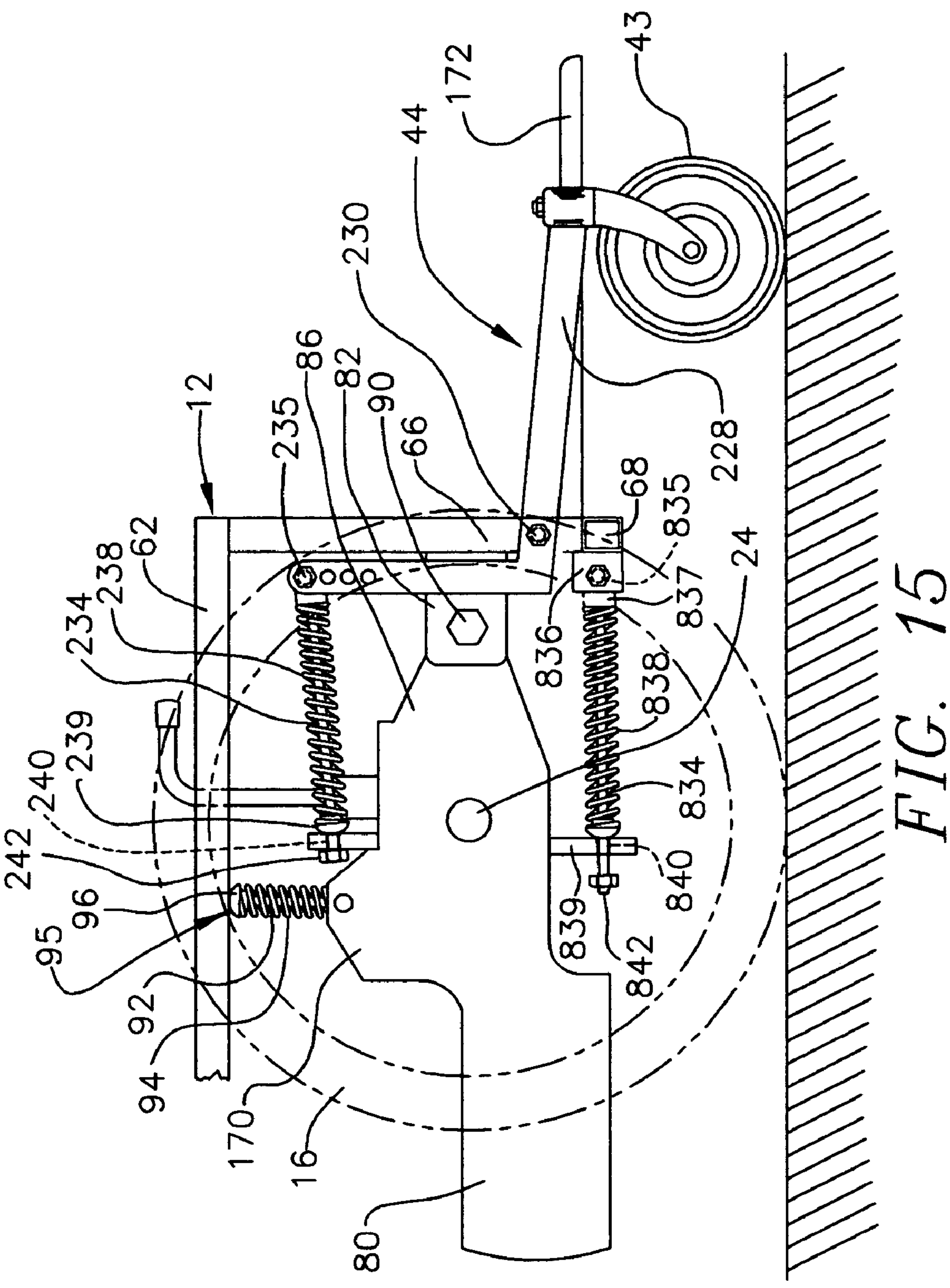
FIG. 15 is a partially broken enlarged side view of the power wheelchair alternative dual spring anti-tip idler wheel suspension shown in FIG. 14, showing another embodiment of an anti-tip device in the form of a ground-engaging idler wheel.

Another configuration of the power wheelchair anti-tip idler wheel assembly, or other anti-tip device, is illustrated in FIG. 15. The resilient suspension shown for this embodiment is similar to the resilient suspension shown for the embodiment illustrated in FIG. 14, with like numerals referring to the same structural elements shown and described for FIG. 14. In the embodiment illustrated in FIG. 15 connecting arm 228 may have a slightly different shape, with the lower portion of the connecting arm being more horizontally disposed. Attached to connecting arm 228 is an idler wheel assembly 43, similar to rear idler wheels 18 shown in FIGS. 2, 3 and 4, which is pivotable about a vertical axis and free to rotate about a horizontal axis. This type of wheel is sometimes referred to as a caster wheel. It should be understood that a second anti-tip idler wheel 43 (not shown) may be included in the present embodiment directly behind the idler wheel 43 that is shown. This second anti-tip idler wheel 43 would be supported by a second resilient suspension (not shown) similar to the resilient suspension shown in FIG. 15. Idler wheel 43 is in a ground-engaging position when power wheelchair 10 is on level ground, with drive wheels 16 and rear idler wheels 18 also being in respective ground-engaging positions. This configuration provides additional stability on inclined surfaces, and also provides all of the other benefits previously described with respect to the resilient suspension configuration illustrated in FIG. 14.

Any upward movement of the anti-tip wheel assembly regardless of the respective spring rates or preloads exerts a downward force on the drive motor housing 80, which enables the power wheelchair to climb obstacles such as curbs more easily. Unlike prior designs, this force can be transferred to the drive motor housing without the loss of effort required to compress the resilient suspension controlling the anti-tip wheel assembly. Additionally, the design of the embodiments according to the present invention allows for independent movement of the drive motor housing and the anti-tip wheel assembly through the resilient suspension. This separation of movement between these components allows for greater design control, improving the safety and performance of the power wheelchair.

It should be understood that other spring assembly designs, such as the spring assembly designs illustrated in FIGS. 12 and 13, could be substituted for the spring assembly design shown in FIG. 15 without departing from the spirit and scope of the present invention.

The tight maneuverability feature of power wheelchair 10 achieved by locating drive wheels 16, which are mid-wheel drive wheels, close to the longitudinal center of the power wheelchair, while having the many advantages described hereinabove, has a minor disadvantage in that there is a slight tendency to tip forwardly if a significant obstacle is encountered when the wheelchair is decelerating or travelling in a forward direction downhill.

The slight tendency towards forward tipping is counteracted by the spring loaded anti-tip wheels 42 located in front of each drive wheel 16. As previously described hereinabove in conjunction with FIGS. 6 and 7, spring loading of anti-tip wheels 42 is accomplished via springs 238 forming portions of spring-shaft-arm combinations 44 biasing anti-tip wheels 42 downwardly toward the ground. When choosing the compression rate or stiffness for springs 238, compromise is required between a spring rate stiff enough to resist forward tipping upon deceleration of the power wheelchair yet light enough to allow the power wheelchair to overcome minor obstacles such as incline transitions, curves or other uneven terrain.

The pivotal connection of the drive motor/transmission housing 80 to frame 12 via the pivotal connection of ear portion 86 on motor/transmission housing 80 to eye portion 82 on frame 12 provides the active independent suspension system for the combination of motor 76 and transmission 78 in housing 80 and associated drive wheel 16. This independent suspension of the drive motor/transmission housing 80 with an associated drive wheel 16 provides some interaction with anti-tip idler wheels 42 and minimizes the range of spring constants which must be considered in the course of the design compromise.

It is preferable to have a light resistance on anti-tip idler wheels 42 for travel over small objects such as thresholds while offering a greater amount of resistance in the event the vertical movement of wheels 42 is due to forward tipping of power wheelchair 10. As the amount of vertical movement of wheels 42 increases, it is also preferable to increase the spring resistance in order to reduce forward tipping.

As a mid-wheel drive power wheelchair, such as power wheelchair 10, tips forward it increases the amount of weight that is placed on anti-tip idler wheels 42. The wheelchair occupant contributes a large portion of the overall weight, and the occupant's higher center of gravity exerts increasing force on wheels 42 as wheelchair 10 tips forward. This force due to the moment created exceeds the actual weight shifted because of the vertical distance from the center of gravity. The actual force, known as the vertical force component of the center of gravity, can be determined using the Federal Aviation Administration (FAA) approved method, which is commonly used as a preflight determination of changes in center of gravity of aircraft due to fuel, baggage, passenger loading and load changes. This method is set forth in many references, one of which is entitled, "An Invitation To Fly—Basics For The Private Pilot" by Dennis Glaeser, Sanford Gum and Bruce Walters published by Wadsworth Publishing Company of Belmont, Calif., Copyright 1989.

In order to resist the increasing force caused by forward tipping of the power wheelchair, increased spring force must be exerted on the anti-tip idler wheels. This increased spring pressure has to exceed the increasing force caused by the occupant and power wheelchair tipping forward. Thus, the faster the spring resistance or spring rate increases, the better it is. This is accomplished in the new design according to the present invention by allowing a greater amount of spring deflection proportional to the vertical movement of anti-tip idler wheels 42.

Following is an example supporting the foregoing explanation. Comparing one of the smaller sized prior art design power wheelchairs (with the resilient suspension that supports the anti-tip idler wheels being forward of the front of the frame) to the same size new design power wheelchairs according to the present invention (with the resilient suspension that supports the anti-tip idler wheels being rearward of the front of the frame), using 10 inch drive wheels, identical length anti-tip arms, 6 inch anti-tip wheels, the same weight and balance, and the same frame and frame constraints (except for the difference in the anti-tip resilient suspension), raising the forward anti-tip wheels 1 inch results in the following differences:

| | New Design | Prior Design | Improvement |
|---|---|---|---|
| Spring Mounting Distance From Pivot | 3 3/16 inches | 2 1/8 inches | 50.00% |
| Deflection (Compression of Spring) | 9/16 inches | 3/8 inches | 50.00% |

This means that using the formula [P=R×F] one can determine the resistance to a load that the spring well exert given the deflection of the spring and the spring rate, where "P" is the load in pounds; "R" is the spring rate in pounds/inch; and "F" is the deflection from free length in inches.

This formula can be found for compression springs on page 2 of the 2003 Lee Spring Company catalog. Lee Spring Company, 1462 62nd Street, Brooklyn, N.Y.

Using another example, a 5 inch long spring rated at 395 pounds/inch exerts the following resistances to a load when compressed:

| Distance Compressed | Resistance To Load |
|---|---|
| 1/8 inch | 49.37 pounds |
| 3/16 inch | 74.06 pounds |
| 1/4 inch | 98.75 pounds |
| 5/16 inch | 123.44 pounds |
| 3/8 inch | 148.13 pounds |
| 7/16 inch | 172.81 pounds |
| 1/2 inch | 197.50 pounds |
| 9/16 inch | 222.19 pounds |

If a power wheelchair of the prior design has a preload of 1/8 inch of compression on the spring, 49.37 pounds of resistance is placed on the connecting arm controlling the anti-tip idler wheel. Raising the anti-tip idler wheel vertically 1 inch will compress the spring of the prior design an additional 3/8 inches, exerting an additional 148.13 pounds for a total of 197.50 pounds of resistance on the connecting arm controlling the anti-tip idler wheel.

By comparison, if power wheelchair 10 of the new design according to the present invention (with the resilient suspension supporting anti-tip idler wheel 42 being rearward of the front of frame 12), has a preload of 1/8 inch of compression on spring 238, a resistance of 49.37 pounds is placed on connecting arm 228 controlling the anti-tip idler wheel. Raising anti-tip idler wheel 42 vertically 1 inch will compress the spring of the new design an additional 9/16 inches, exerting an additional 222.19 pounds for a total of 271.56 pounds of resistance on connecting arm 228 controlling anti-tip idler wheel 42.

Thus, in this example, the new design according to the present invention produces a 37.5% increase in resistance to prevent forward tipping over the prior design after the same 1 inch of vertical movement of the anti-tip idler wheel. This is a significant advantage in that it allows for an increase in the power wheelchair occupant's maximum weight while increasing safety.

In small and medium size power wheelchairs, with the same geometry, the new design according to the present invention will allow for the distance from mounting hole 235 at one end of connecting arm 228 to the pivot point (designated as numeral 230 in FIG. 6) to be 30% to 100% longer than the prior design, thus providing a greater amount of deflection from the free length of spring 238.

Larger power wheelchairs designed for more outdoor use would have an even greater advantage due to the increased space within the frame. This increased space would allow for more than 100% increase in spring compression over the prior design with similar geometry. Traditionally, power wheelchairs used outdoors attain higher speeds and can exert even greater pressure on the anti-tip wheels due to greater inertia. In these larger power wheelchairs the new design according to the present invention could exert more than double the resistive force to tipping than the prior design, using the same preferred light resistance of spring pre-load. This is a significant advantage that would compensate for increased power wheelchair speed and increased maximum weight of a wheelchair occupant while simultaneously increasing safety.

In the prior design each forward mounted anti-tip wheel spring base was mounted in close proximity to an anti-tip wheel because of space limitations. This arrangement interfered with the body styling and the hardware to support the occupant's legs and feet. Because of this drawback, the top of the spring was generally mounted closer to the front portion of the frame than the bottom of the spring in order to minimize this problem, particularly in smaller size power wheelchairs. This resulted in the anti-tip wheel springs being mounted at an angle to the direction of movement of the spring's pivotal connection to the anti-tip wheel connecting arm. This angle from the direction of movement reduced the amount of deflection available for compression of the spring. Attempting to increase the mechanical advantage of the prior design by moving the spring forward would compound all of the aforementioned problems (i.e., body styling, manufacturing of body, safety, reduced foot space, angle of legs, overall length and turning radius), and would at some point begin to interfere with the functioning of the anti-tip wheel.

Such a reduction in the amount of compression of the spring from its free length is a disadvantage in providing safe, reliable anti-tip capability in the use of power wheelchairs. This drawback is virtually eliminated by relocating the anti-tip wheel springs no further forward than, or preferably rearward of, the front portion of frame 12.

Control of power wheelchair 10 is effectuated utilizing a joystick controller 196 illustrated in FIGS. 1 and 2. Joystick controller 196 is programmable and adjustable to provide variable sensitivity for the user. During the operation of power wheelchair 10, joystick controller 196 is programmed so that direction or steering is the first correction provided in response to movement of the joystick. A microprocessor is provided which further controls operation of power wheelchair 10 by increasing or decreasing speed according to a logarithmic function of the joystick position. This speed correction is programmed to be provided after steering correction.

The present invention can be best understood by those skilled in the art by reference to the above description and figures, both of which are not intended to be exhaustive or to limit the invention to the specific embodiments disclosed. The figures are chosen to describe or to best explain the principles of the invention and its applicable and practical use to thereby enable others skilled in the art to best utilize the invention.

While there has been described what is believed to be a preferred embodiment of the invention, those skilled in the art will recognize that other and further modifications may be made thereto without departing from the spirit and scope of the invention. It is therefore intended to claim all such embodiments that fall within the true scope of the invention.

What is claimed is:

1. A power wheelchair comprising:

a. a frame;

b. a seat supported by said frame;

c. a pair of drive wheels positioned below a central portion of said seat on opposite sides of said frame and supported thereon, said drive wheels rotatable about transverse axes;

d. drive means for causing rotation of said drive wheels, said drive means being operatively connected to said frame rearward of said front portion of said frame;

e. power means for supplying power to said drive means to move the wheelchair;

f. control means for controlling the rotation of said drive wheels by said drive means;

g. at least one idler wheel operatively connected to said frame and positioned behind said drive wheels and rearward of the back of said seat, said idler wheel mounted for rotation about a horizontal axis and supported for rotational movement about a vertical axis;

h. at least one anti-tip device operatively connected to said frame and positioned forward of said drive wheels and said frame, said anti-tip device being operatively connected to said drive means and being positioned off the ground when said drive wheels and said rear idler wheel are in their normal ground-engaging position on level ground; and i. a resilient suspension supporting said forward anti-tip device for resisting upward arcuate movement of said anti-tip device, said resilient suspension comprising a first assembly and a first member, said first assembly being operatively attached to said drive means at a first location rearward of the front portion of said frame and said first member being pivotally attached to said frame at a second location, said first member comprising a substantially upright portion and a substantially transverse portion having an angle therebetween, said first assembly being pivotally attached to said substantially upright portion of said first member at a third location rearward of the front portion of said frame, and the substantially transverse portion of said first member being operatively attached to said anti-tip device.

2. The power wheelchair of claim 1, wherein said resilient suspension pivotal attachment second location is coincident with the front portion of said frame.

3. The power wheelchair of claim 1, wherein said first assembly includes a spring assembly and said first member includes a connecting arm, said spring assembly being operatively attached adjacent one end thereof to said drive means at said first location, and pivotally attached adjacent another end thereof to said connecting arm at said third location, said connecting arm being pivotally attached to said frame at said second location.

4. The power wheelchair of claim 3, wherein said connecting arm pivotal attachment second location is coincident with the front portion of said frame.

5. The power wheelchair of claim 3, wherein said spring assembly includes a spring and a shall, said spring surrounding said shaft, and said shaft being operatively attached adjacent one end thereof to said drive means at said first location, and pivotally attached adjacent another end thereof to said connecting arm at said third location.

6. The power wheelchair of claim 3, wherein said connecting arm is operatively attached to said anti-tip device at a fourth location.

7. The power wheelchair of claim 1, further including a pair of anti-tip devices and a pair of resilient suspensions, each one of said resilient suspensions being operatively connected to one of said anti-tip devices.

8. The power wheelchair of claim 3, further including a pair of anti-tip devices and a pair of resilient suspensions, each one of said resilient suspensions being operatively connected to one of said anti-tip devices.

9. The power wheelchair of claim 1, wherein said seat has a cushion portion for supporting an operator's thighs and buttocks and a back portion for supporting an operator's back when the operator is in a seated upright position.

10. The power wheelchair of claim 1, which further includes a seat support member attached to said frame for supporting said seat above said frame.

11. The power wheelchair of claim 1, wherein said drive wheels are positioned below a central portion of said seat.

12. The power wheelchair of claim 1, wherein said drive means includes at least one motor for powered movement of the wheelchair.

13. The power wheelchair of claim 1, wherein said power means includes a battery.

14. The power wheelchair of claim 1, wherein said first location operative attachment point is rearward of said second location pivotal attachment point.

15. The power wheelchair of claim 3, wherein said third location pivotal attachment point is rearward of said second location pivotal attachment point and is rearward of the front portion of said frame.

16. The power wheelchair of claim 3, wherein said anti-tip device is forward of the front portion of said frame and said spring assembly is rearward of said anti-tip device and no further forward than the front portion of said frame.

17. The power wheelchair of claim 3, wherein said anti-tip device is forward of the front portion of said frame and said spring assembly is rearward of the front portion of said frame.

18. The power wheelchair of claim 3, wherein said spring assembly comprises a shaft, a spring surrounding said shaft and operatively in contact with said drive means, and a nut assembly mounted on said shaft and in operative contact with said drive means for providing selectable compression of said spring in order to provide adjustment of the spring force applied to said anti-tip device to resist arcuate upward movement thereof upon forward tipping of the power wheelchair or upon said said anti-tip device encountering an obstacle.

19. The power wheelchair of claim 18, wherein said nut assembly is operative to compress said spring in order to adjust the distance of said anti-tip device from the ground on a flat, level surface when said drive wheels and said rear idler wheel are in contact with the ground.

20. The power wheelchair of claim 3, wherein said connecting arm includes more than one attachment point for pivotal attachment of said spring assembly thereto at said third location.

21. The power wheelchair of claim 1, wherein the position of said anti-tip device off the ground is adjustable by selectively modifying said resilient suspension.

22. The power wheelchair of claim 3, wherein said resilient suspension includes means for adjusting the length of said spring assembly.

23. The power wheelchair of claim 22, wherein the position of said anti-tip device off the ground is adjustable by selectively adjusting the length of said spring assembly.

24. The power wheelchair of claim 3, wherein the position of said anti-tip device off the ground is adjustable by selectively modifying the pre-load force of said spring assembly.

25. The power wheelchair of claim 3, wherein the pre-load force of said spring assembly is adjustable by compressing or decompressing said spring assembly.

26. The power wheelchair of claim 1, wherein said resilient suspension includes a spring assembly and a connecting arm, said spring assembly including a shaft, first biasing means and second biasing means, said first and second biasing means being operatively associated with said shaft and being in operative contact with each other, and said shaft being operatively attached at one end thereof to said drive means at said first location, and pivotally attached at another end thereof to said connecting arm at said third location, said connecting arm being pivotally attached to said frame at said second location.

27. The power wheelchair of claim 26, wherein said first biasing means and said second biasing means each exert a different biasing force.

28. The power wheelchair of claim 26, wherein said first biasing means and said second biasing means are adapted to urge said anti-tip device toward the ground.

29. The power wheelchair of claim 26, wherein said first biasing means comprises a first spring and said second biasing means comprises a second spring, said first spring and said second spring surrounding said shaft and being in operative contact with each other, each of said first spring and said second spring exerting a different biasing force, and wherein said first spring and said second spring uge said anti-tip device toward the ground.

30. The power wheelchair of claim 29, wherein said first spring has a predetermined amount of compression, and the amount of compression of said second spring is adjustable.

31. The power wheelchair of claim 29, wherein said first spring and said second spring have a member therebetween, said member being in operative contact with said first spring and said second spring.

32. The power wheelchair of claim 31, wherein said member is a washer.

33. The power wheelchair of claim 29, wherein said spring assembly includes a first nut assembly proximate one end of said first spring and in operative contact therewith, and a second nut assembly proximate one end of said second spring and in operative contact therewith.

34. The power wheelchair of claim 33, wherein said first nut assembly is operative to exert a compressive force on said first spring, and said second nut assembly is operative to exert a compressive force on said second spring.

35. The power wheelchair of claim 33, wherein said first nut assembly includes a first nut and a first washer, and said second nut assembly includes a second nut and a second washer.

36. The power wheelchair of claim 1, wherein said anti-tip device is an idler wheel, said idler wheel mounted for rotation about a horizontal axis and supported for rotational movement about a vertical axis.

37. The power wheelchair of claim 3, wherein said anti-tip device is an idler wheel, said idler wheel mounted for rotation about a horizontal axis and supported for rotational movement about a vertical axis.

38. The power wheelchair of claim 6, wherein said connecting arm operative attachment fourth location is a pivotal attachment.

39. A power wheelchair comprising:

a. a frame having a front portion, a rear portion and a top portion;

b. a seat removably mounted on the top portion of said frame, the seat having a cushion portion for supporting a person's buttocks and thighs and a back portion for supporting a person's back when seated in said seat, said back portion being positioned above the rear portion of said frame;

c. a pair of drive wheels independently mounted on said frame and rotatable about an axis transverse to said frame, the drive wheel axis positioned below said seat and forward of the center of said cushion portion;

d. a motor for causing rotation of said drive wheels, said motor being supported on said frame;

e. a joystick for controlling the activation of said motor and resulting movement of the power wheelchair by said drive wheels;

f. a battery for supplying power to said motor, said battery being operatively supported on said frame;

g. at least one ground-engaging idler wheel connected to the rear portion of said frame behind said drive wheels;

h. at least one anti-tip idler wheel positioned forward of said drive wheels, the front of said cushion portion and the forward portion of said frame, said forward anti-tip idler wheel being positioned off the ground when said drive wheels and said rear idler wheel are in their normal ground-engaging position on level ground; and i. a resilient suspension supporting said forward anti-tip idler wheel, said resilient suspension being operatively attached to said motor at a first location and pivotally attached to said frame at a second location, each of said first location and said second location being no further forward than the front portion of said frame.

40. A power wheelchair comprising:

a. a frame having a front portion, a rear portion and a top portion;

b. a seat removably mounted on the top portion of said frame, the seat having a cushion portion for supporting a person's buttocks and thighs and a back portion for supporting a person's back when seated in said seat, said back portion being positioned above the rear portion of said frame;

c. a pair of drive wheels independently mounted on said frame and rotatable about an axis transverse to said frame, the drive wheel axis positioned below said seat and forward of the center of said cushion portion;

d. a motor for causing rotation of said drive wheels, said motor being supported on said frame;

e. a joystick for controlling the activation of said motor and resulting movement of the power wheelchair by said drive wheels;

f. a battery for supplying power to said motor, said battery being operatively supported on said frame;

g. at least one ground-engaging idler wheel connected to the rear portion of said frame behind said drive wheels;

h. at least one anti-tip idler wheel positioned forward of said drive wheels, the front of said cushion portion and the forward portion of said frame, said forward anti-tip idler wheel being positioned off the ground when said drive wheels and said rear idler wheel are in their normal ground-engaging position on level ground; and i. a resilient suspension for said forward anti-tip idler wheel, said resilient suspension supporting said forward anti-tip idler wheel and being operatively attached to said motor at a first location no further forward than the front portion of said frame and pivotally attached to said frame at a second location no further forward than the front portion of said frame.

41. A power wheelchair comprising:

a. a frame;

b. a seat supported by said frame;

c. a pair of drive wheels positioned below a central portion of said seat on opposite sides of said frame and supported thereon, said drive wheels rotatable about transverse axes;

d. drive means for causing rotation of said drive wheels, said drive means being operatively connected to said frame at a first location and operatively connected to said frame at a second location, said first and said second locations being no further forward than the front portion of said frame;

e. power means for supplying power to said drive means to move the wheelchair;

f. control means for controlling the rotation of said drive wheels by said drive means;

g. at least one idler wheel operatively connected to said frame and positioned behind said drive wheels and rearward of the back of said seat, said idler wheel mounted for rotation about a horizontal axis and supported for rotational movement about a vertical axis;

h. at least one anti-tip device operatively connected to said frame and positioned forward of said drive wheels and said frame, said anti-tip device being in engagement with the ground when said drive wheels and said rear idler wheel are in their normal ground-engaging position on level ground; and i. a resilient suspension supporting said forward anti-tip device, said suspension being operatively attached to said drive means at a third location and operatively attached to said frame at a fourth location.

42. The power wheelchair of claim 41, wherein each of said third location and said fourth location is no further forward than the front portion of said frame.

43. The power wheelchair of claim 41, wherein said anti-tip device is an idler wheel, said idler wheel mounted for rotation about a horizontal axis and supported for rotational movement about a vertical axis.

44. The power wheelchair of claim 43, wherein said idler wheel is a caster wheel.

* * * * *